(12) United States Patent
Emi

(10) Patent No.: US 10,983,308 B2
(45) Date of Patent: Apr. 20, 2021

(54) IMAGING LENS SYSTEM AND CAMERA

(71) Applicant: Panasonic Intellectual Property Management Co., Ltd., Osaka (JP)

(72) Inventor: Kenichi Emi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 202 days.

(21) Appl. No.: 16/318,437

(22) PCT Filed: Oct. 17, 2017

(86) PCT No.: PCT/JP2017/037436
§ 371 (c)(1),
(2) Date: Jan. 17, 2019

(87) PCT Pub. No.: WO2018/074438
PCT Pub. Date: Apr. 26, 2018

(65) Prior Publication Data
US 2019/0293907 A1 Sep. 26, 2019

(30) Foreign Application Priority Data
Oct. 19, 2016 (JP) .............................. JP2016-205565

(51) Int. Cl.
*G02B 9/12* (2006.01)
*G02B 13/00* (2006.01)
(Continued)

(52) U.S. Cl.
CPC ......... *G02B 13/0035* (2013.01); *G02B 7/008* (2013.01); *G02B 9/12* (2013.01); *G02B 13/04* (2013.01); *G02B 13/18* (2013.01)

(58) Field of Classification Search
CPC .... G02B 13/0035; G02B 13/18; G02B 7/008; G02B 13/04; G02B 9/12
See application file for complete search history.

(56) References Cited

U.S. PATENT DOCUMENTS 4,403,837 A * 9/1983 Nakahashi ............... G02B 9/60
359/740
6,185,049 B1 2/2001 Terada et al.
(Continued)

FOREIGN PATENT DOCUMENTS

JP 7-092385 4/1995
JP H07-092385 * 4/1995 ............. G02B 13/04
(Continued)

OTHER PUBLICATIONS

International Search Report of PCT application No. PCT/JP2017/037436 dated Jan. 23, 2018.

*Primary Examiner* — Joseph P Martinez
(74) *Attorney, Agent, or Firm* — McDermott Will and Emery LLP

(57) ABSTRACT

An imaging lens system includes, in order from an object side: a first lens group consisting of at least one lens element having negative power; a second lens group having positive power and configured with a single lens element; and a third lens group having power, and the third lens group includes a lens element having positive power and a lens element having negative power. In addition, conditional expressions (1) and (2) shown below are simultaneously satisfied: $-1.2 \times 10^{-5} < dn/dt_{pi} < 0$, where $i \geq 1$ (1); $-1.0 \times 10^{-6} < dn/dt_{mi} < 1.5 \times 10^{-5}$, where $i \geq 1$ (2), where $dn/dt_{pi}$ is a relative refractive index temperature coefficient, of an i-th lens element having positive power included in an entire system for light in a wavelength range from 580 nm to 640 nm in air in a range from 0° C. to 20° C., and $dn/dt_{mi}$ is a relative refractive index temperature coefficient, of an i-th lens element having negative power included in the entire system for light in a wavelength range from 580 nm to 640 nm in air in a range from 0° C. to 20° C.

7 Claims, 11 Drawing Sheets

(51) Int. Cl.
  *G02B 13/18* (2006.01)
  *G02B 7/00* (2021.01)
  *G02B 13/04* (2006.01)

(56) References Cited

U.S. PATENT DOCUMENTS

| | | |
|---|---|---|
| 2006/0285223 A1 | 12/2006 | Watanabe et al. |
| 2010/0076268 A1 | 3/2010 | Takasugi et al. |
| 2013/0070114 A1 | 3/2013 | Imaoka |
| 2016/0252707 A1 | 9/2016 | Emi |

FOREIGN PATENT DOCUMENTS

| | | |
|---|---|---|
| JP | 2000-066103 | 3/2000 |
| JP | 2005-148435 | 6/2005 |
| JP | 2006-350027 | 12/2006 |
| JP | 2008-083316 | 4/2008 |
| JP | 2010-097208 | 4/2010 |
| JP | 2012-123178 | 6/2012 |
| JP | 2012-141464 | 7/2012 |
| JP | 2013-068690 | 4/2013 |
| JP | 2014-102291 | 6/2014 |
| WO | 2015/072094 | 5/2015 |

\* cited by examiner

IMAGING LENS SYSTEM AND CAMERA

CROSS-REFERENCE TO RELATED APPLICATIONS

This application is a U.S. national stage application of the PCT International Application No. PCT/JP2017/037436 filed on Oct. 17, 2017, which claims the benefit of foreign priority of Japanese patent application 2016-205565 filed on Oct. 19, 2016, the contents all of which are incorporated herein by reference.

TECHNICAL FIELD

The present disclosure relates to an imaging lens system and a camera.

BACKGROUND ART

PTL 1 discloses a single focus lens system, and the single focus lens system is sufficiently wide-angled and small-sized, and at the same time, has excellent temperature characteristics.

CITATION LIST

Patent Literature

PTL 1: International Application Publication No. 2015/072094

SUMMARY OF THE INVENTION

The present disclosure provides an imaging lens system and a camera that are small-sized and, at the same time, have excellent temperature characteristics.

An imaging lens system in the present disclosure includes, in order from an object side to an image side: a first lens group consisting of at least one lens element having negative power; a second lens group having positive power and configured with a single lens element; and a third lens group having power. The third lens group includes a lens element having positive power and a lens element having negative power, and is an imaging lens system that simultaneously satisfies condition (1) and mathematical expression (2) shown below.

$$-1.2\times10^{-5} < dn/dt_{pi} < 0, \text{ where } i \geq 1 \tag{1}$$

$$-1.0\times10^{-6} < dn/dt_{mi} < 1.5\times10^{-5}, \text{ where } i \geq 1 \tag{2}$$

where $dn/dt_{pi}$ is a relative refractive index temperature coefficient, of an i-th lens element having positive power included in an entire system, for light in a wavelength range from 580 nm to 640 nm, inclusive, in air in a range from 0° C. to 20° C., inclusive, and $dn/dt_{mi}$ is a relative refractive index temperature coefficient, of an i-th lens element having negative power included in the entire system, for light in a wavelength range from 580 nm to 640 nm, inclusive, in air in a range from 0° C. to 20° C., inclusive.

In addition, a camera in the present disclosure includes an imaging lens system and an imaging device that images light converged by the imaging lens system. The imaging lens system in the present disclosure includes, in order from an object side to an image side: a first lens group consisting of at least one lens element having negative power; a second lens group having positive power and configured with a single lens element; and a third lens group having power. The third lens group includes a lens element having positive power and a lens element having negative power, and the imaging lens system simultaneously satisfies conditions (1) and (2) shown below.

$$-1.2\times10^{-5} < dn/dt_{pi} < 0, \text{ where } i \geq 1 \tag{1}$$

$$-1.0\times10^{-6} < dn/dt_{mi} < 1.5\times10^{-5}, \text{ where } i \geq 1 \tag{2}$$

where $dn/dt_{pi}$ is a relative refractive index temperature coefficient, of an i-th lens element having positive power included in an entire system, for light in a wavelength range from 580 nm to 640 nm, inclusive, in air in a range from 0° C. to 20° C., inclusive, and $dn/dt_{mi}$ is a relative refractive index temperature coefficient, of an i-th lens element having negative power included in the entire system, for light in a wavelength range from 580 nm to 640 nm, inclusive, in air in a range from 0° C. to 20° C., inclusive.

The imaging lens system of the present disclosure is small sized but has such excellent temperature characteristics that the optical characteristics does not vary with a wide range of temperature change.

DESCRIPTION OF EMBODIMENTS

Figure 1:
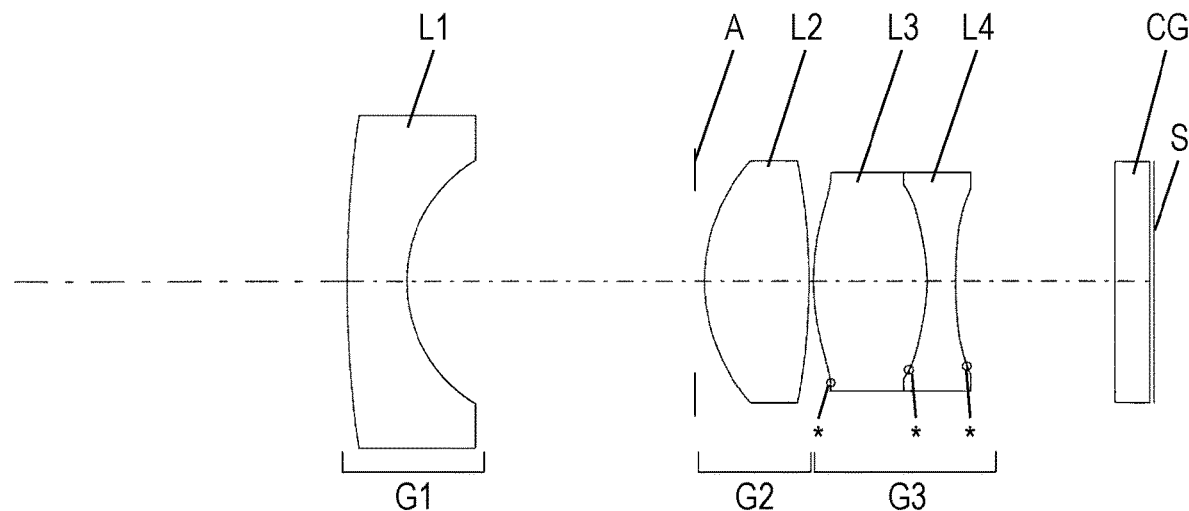
FIG. 1 is a lens arrangement diagram showing an imaging lens system according to a first exemplary embodiment (a first numerical example) in an infinity focusing state.
Figure 2:
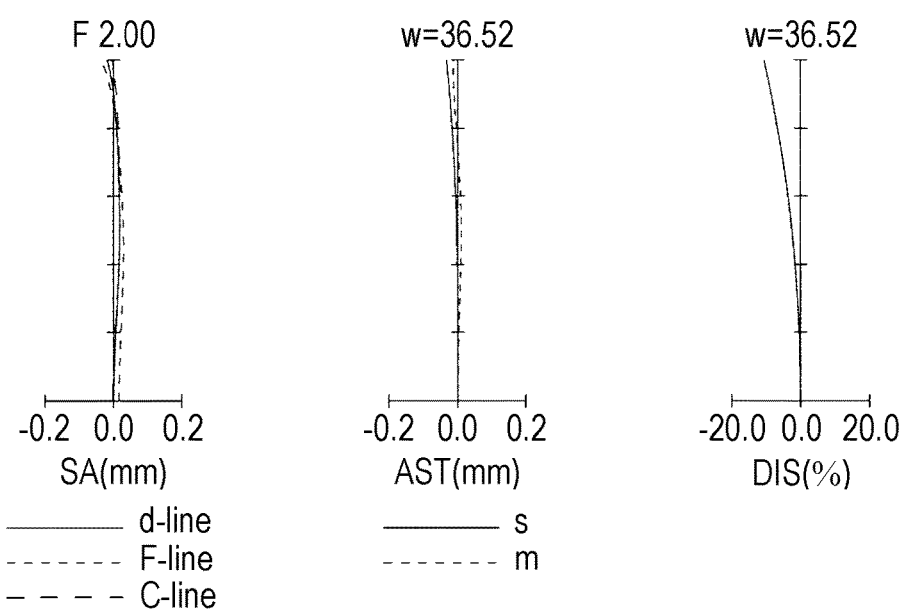
FIG. 2 is a longitudinal aberration diagram of the imaging lens system according to the first numerical example at an infinity focusing state.

Hereinafter, exemplary embodiments will be described in detail with reference to the drawings as appropriate. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the present inventor will provide the accompanying drawings and the following description for those skilled in the art to sufficiently understand the present disclosure, and does not intend to limit the subject matter described in the claims.

In the present disclosure, each of a first lens group and a second lens group is configured with at least one lens element, and a third lens group includes at least one lens element having positive power and at least one lens element having negative power. Note that power, a composite focal length, and the like of each lens group are determined depending on kinds, a number, and an arrangement of the lens elements constituting each lens group.

First to Tenth Exemplary Embodiments: Imaging Lens System

FIGS. 1, 3, 5, 7, 9, 11, 13, 15, 17, and 19 are respectively lens arrangement diagrams of imaging lens systems according to the first to tenth exemplary embodiments. In each drawing, an asterisk "*" attached to a certain surface shows that the surface is aspherical. Further, the straight line drawn on the rightmost side of each drawing represents a position of image plane S, and parallel plate CG is provided on an object side of image plane S. Note that an aspect ratio of each drawing is 1.

First Exemplary Embodiment

An imaging lens system according to a first exemplary embodiment includes, in order from an object side to an image side: first lens group G1 having negative power; aperture diaphragm A; second lens group G2 having positive power; and third lens group G3 having positive power.

First lens group G1 is configured with first lens element L1. Second lens group G2 is configured with second lens element L2. Third lens group G3 is configured with a cemented lens consisting of, in order from the object side to the image side, third lens element L3 and fourth lens element L4.

First lens element L1 is a glass lens having negative power and is a negative meniscus lens convex toward the object side.

Second lens element L2 is a glass lens having positive power and is a biconvex lens.

The cemented lens has positive power. In the cemented lens, third lens element L3 and fourth lens element L4 are cemented to each other with an adhesive or the like.

Third lens element L3 is a glass lens having positive power and is a biconvex lens.

Fourth lens element L4 is a glass lens having negative power and is a biconcave lens.

In the cemented lens, each of a convex surface on the object side of third lens element L3, the cemented surface between third lens element L3 and fourth lens element L4, and the concave surface on an image plane side of fourth lens element L4 has an aspherical shape.

The convex surface on the object side of third lens element L3 is an aspherical surface having weaker positive power at positions farther from an optical axis.

The cemented surface between third lens element L3 and fourth lens element L4 is convex toward the image plane side and is an aspherical surface having weaker power at positions farther from the optical axis.

A concave surface on the image plane side of fourth lens element L4 is an aspherical surface having stronger negative power at positions farther from the optical axis.

Second Exemplary Embodiment

An imaging lens system according to a second exemplary embodiment includes, in order from an object side to an image side: first lens group G1 having negative power; aperture diaphragm A; second lens group G2 having positive power; and third lens group G3 having positive power.

First lens group G1 is configured with first lens element L1. Second lens group G2 is configured with second lens element L2. Third lens group G3 is configured with a cemented lens consisting of, in order from the object side to the image side, third lens element L3 and fourth lens element L4.

First lens element L1 is a glass lens having negative power and is a negative meniscus lens convex toward the object side.

Second lens element L2 is a glass lens having positive power and is a biconvex lens.

The cemented lens has positive power. In the cemented lens, third lens element L3 and fourth lens element L4 are cemented to each other with an adhesive or the like, in order from the object side to the image side.

Third lens element L3 is a glass lens having positive power and is a biconvex lens.

Fourth lens element L4 is a glass lens having negative power and is a biconcave lens.

In the cemented lens, each of a convex surface on the object side of third lens element L3, the cemented surface between third lens element L3 and fourth lens element L4, and the concave surface on an image plane side of fourth lens element L4 has an aspherical shape.

The convex surface on the object side of third lens element L3 is an aspherical surface having weaker positive power at positions farther from an optical axis.

The cemented surface between third lens element L3 and fourth lens element L4 is convex toward the image plane side and is an aspherical surface having weaker power at positions farther from the optical axis.

A concave surface on the image plane side of fourth lens element L4 is an aspherical surface having stronger negative power at positions farther from the optical axis.

Third Exemplary Embodiment

An imaging lens system according to a third exemplary embodiment includes, in order from an object side to an image side: first lens group G1 having negative power; aperture diaphragm A; second lens group G2 having positive power; and third lens group G3 having positive power.

First lens group G1 is configured with first lens element L1. Second lens group G2 is configured with second lens element L2. Third lens group G3 is configured with a cemented lens consisting of, in order from the object side to the image side, third lens element L3 and fourth lens element L4.

First lens element L1 is a glass lens having negative power and is a negative meniscus lens convex toward the object side.

Second lens element L2 is a glass lens having positive power and is a biconvex lens. The cemented lens has positive power.

Second lens element L2 has an aspherical shape on each of the convex surfaces on the object side and an image plane side.

The convex surface on the object side of second lens element L2 is an aspherical surface having stronger positive power at positions farther from an optical axis. The convex surface on the image plane side is an aspherical surface having weaker positive power at positions farther from the optical axis.

In the cemented lens, third lens element L3 and fourth lens element L4 are cemented to each other with an adhesive or the like.

Third lens element L3 is a glass lens having positive power and is a biconvex lens.

Fourth lens element L4 is a glass lens having negative power and is a biconcave lens. In the cemented lens, the concave surface on the image plane side of fourth lens element L4 has an aspherical shape.

A concave surface on the image plane side of fourth lens element L4 is an aspherical surface having stronger negative power at positions farther from the optical axis.

Fourth Exemplary Embodiment

An imaging lens system according to a fourth exemplary embodiment includes, in order from an object side to an image side: first lens group G1 having negative power; aperture diaphragm A; second lens group G2 having positive power; and third lens group G3 having positive power.

First lens group G1 is configured with first lens element L1. Second lens group G2 is configured with second lens element L2. Third lens group G3 is configured with a cemented lens consisting of, in order from the object side to the image side, third lens element L3 and fourth lens element L4.

First lens element L1 is a glass lens having negative power and is a negative meniscus lens convex toward the object side.

Second lens element L2 is a glass lens having positive power and is a biconvex lens.

Second lens element L2 has an aspherical shape on each of the convex surfaces on the object side and an image plane side.

The convex surface on the object side of second lens element L2 is an aspherical surface having stronger positive power at positions farther from an optical axis. The convex surface on the image plane side is an aspherical surface having weaker positive power at positions farther from the optical axis.

The cemented lens has positive power. In the cemented lens, third lens element L3 and fourth lens element L4 are cemented to each other with an adhesive or the like.

Third lens element L3 is a glass lens having positive power and is a biconvex lens.

Fourth lens element L4 is a glass lens having negative power and is a biconcave lens.

In the cemented lens, the concave surface on the image plane side of fourth lens element L4 has an aspherical shape.

A concave surface on the image plane side of fourth lens element L4 is an aspherical surface having stronger negative power at positions farther from the optical axis.

Fifth Exemplary Embodiment

An imaging lens system according to a fifth exemplary embodiment includes, in order from an object side to an image side: first lens group G1 having negative power; aperture diaphragm A; second lens group G2 having positive power; and third lens group G3 having negative power.

First lens group G1 is configured with first lens element L1. Second lens group G2 is configured with second lens element L2. Third lens group G3 is configured with, in order from the object side to the image side, third lens element L3 and fourth lens element L4.

First lens element L1 is a glass lens having negative power and is a negative meniscus lens convex toward the object side.

Second lens element L2 is a glass lens having positive power and is a biconvex lens. Second lens element L2 has an aspherical shape on each of the convex surfaces on the object side and an image plane side.

The convex surface on the object side of second lens element L2 is an aspherical surface having weaker positive power at positions farther from an optical axis. The convex surface on the image plane side is an aspherical surface having weaker positive power at positions farther from the optical axis.

Third lens element L3 is a glass lens having positive power and is a biconvex lens.

Fourth lens element L4 is a glass lens having negative power and is a biconcave lens.

Sixth Exemplary Embodiment

An imaging lens system according to a sixth exemplary embodiment includes, in order from an object side to an image side: first lens group G1 having negative power; aperture diaphragm A; second lens group G2 having positive power; and third lens group G3 having negative power.

First lens group G1 is configured with first lens element L1. Second lens group G2 is configured with second lens element L2. Third lens group G3 is configured with, in order from the object side to the image side, third lens element L3 and fourth lens element L4.

First lens element L1 is a glass lens having negative power and is a negative meniscus lens convex toward the object side.

Second lens element L2 is a glass lens having positive power and is a biconvex lens. Second lens element L2 has an aspherical shape on each of the convex surfaces on the object side and an image plane side.

The convex surface on the object side of second lens element L2 is an aspherical surface having weaker positive power at positions farther from an optical axis. The convex surface on the image plane side is an aspherical surface having weaker positive power at positions farther from the optical axis.

Third lens element L3 is a glass lens having positive power and is a biconvex lens.

Fourth lens element L4 is a glass lens having negative power and is a biconcave lens.

Seventh Exemplary Embodiment

An imaging lens system according to a seventh exemplary embodiment includes, in order from an object side to an image side: first lens group G1 having negative power; aperture diaphragm A; second lens group G2 having positive power; and third lens group G3 having positive power.

First lens group G1 is configured with first lens element L1. Second lens group G2 is configured with second lens element L2. Third lens group G3 is configured with a cemented lens consisting of, in order from the object side to the image side, third lens element L3 and fourth lens element L4.

First lens element L1 is a glass lens having negative power and is a negative meniscus lens convex toward the object side.

First lens element L1 has an aspherical shape on the concave surface on an image plane side.

The concave surface on the image plane side is an aspherical surface having weaker negative power at positions farther from an optical axis.

Second lens element L2 is a glass lens having positive power and is a positive meniscus lens convex toward the image plane side.

The cemented lens has positive power. In the cemented lens, third lens element L3 and fourth lens element L4 are cemented to each other with an adhesive or the like.

Third lens element L3 is a glass lens having negative power and is a negative meniscus lens convex toward the object side.

Fourth lens element L4 is a glass lens having positive power and is a biconvex lens. Fourth lens element L4 has an aspherical shape on the convex surface on the image plane side.

The convex surface on the image plane side of fourth lens element L4 is an aspherical surface having weaker positive power at positions farther from the optical axis.

Eighth Exemplary Embodiment

An imaging lens system according to an eighth exemplary embodiment includes, in order from an object side to an image side: first lens group G1 having negative power; aperture diaphragm A; second lens group G2 having positive power; and third lens group G3 having positive power.

First lens group G1 is configured with first lens element L1. Second lens group G2 is configured with second lens element L2. Third lens group G3 is configured with a cemented lens consisting of, in order from the object side to the image side, third lens element L3 and fourth lens element L4.

First lens element L1 is a glass lens having negative power and is a negative meniscus lens convex toward the object side.

First lens element L1 has an aspherical shape on the concave surface on an image plane side. The concave surface on the image plane side is an aspherical surface having weaker negative power at positions farther from an optical axis.

Second lens element L2 is a glass lens having positive power and is a positive meniscus lens convex toward the image plane side.

The cemented lens has positive power. In the cemented lens, third lens element L3 and fourth lens element L4 are cemented to each other with an adhesive or the like.

Third lens element L3 is a glass lens having negative power and is a negative meniscus lens convex toward the object side.

Fourth lens element L4 is a glass lens having positive power and is a biconvex lens.

Fourth lens element L4 has an aspherical shape on the convex surface on the image plane side. The convex surface on the image plane side of fourth lens element L4 is an aspherical surface having weaker positive power at positions farther from the optical axis.

Ninth Exemplary Embodiment

An imaging lens system according to a ninth exemplary embodiment includes, in order from an object side to an image side: first lens group G1 having negative power; second lens group G2 having positive power; aperture diaphragm A; and third lens group G3 having positive power.

First lens group G1 is configured with first lens element L1 and second lens element L2. Second lens group G2 is configured with third lens element L3. Third lens group G3 is configured with a cemented lens consisting of, in order from the object side to the image side, fourth lens element L4 and fifth lens element L5.

First lens element L1 is a glass lens having negative power and is a negative meniscus lens convex toward the object side.

Second lens element L2 is a glass lens having negative power and is a negative meniscus lens convex toward the object side.

Second lens element L2 has an aspherical shape on each of the convex surface on the object side and the concave surface on an image plane side.

The convex surface on the object side of second lens element L2 is an aspherical surface having weaker positive power at positions farther from an optical axis. The concave surface on the image plane side is an aspherical surface having weaker negative power at positions farther from the optical axis.

Third lens element L3 is a glass lens having positive power and is a biconvex lens.

The cemented lens has positive power. In the cemented lens, fourth lens element L4 and fifth lens element L5 are cemented to each other with an adhesive or the like.

Fourth lens element L4 is a glass lens having negative power and is a negative meniscus lens convex toward the object side.

Fifth lens element L5 is a glass lens having positive power and is a biconvex lens.

In the cemented lens, each of a convex surface on an object side of fourth lens element L4, the cemented surface between fourth lens element L4 and fifth lens element L5, and the convex surface on the image plane side of fifth lens element L5 has an aspherical shape.

The convex surface on the object side of fourth lens element L4 is an aspherical surface having weaker positive power at positions farther from the optical axis.

The cemented surface between fourth lens element L4 and fifth lens element L5 is convex toward the object side and is an aspherical surface having weaker power at positions farther from the optical axis.

The convex surface on the image plane side of fifth lens element L5 is an aspherical surface having weaker positive power at positions farther from the optical axis.

Tenth Exemplary Embodiment

An imaging lens system according to a tenth exemplary embodiment includes, in order from an object side to an image side: first lens group G1 having negative power; aperture diaphragm A; second lens group G2 having positive power; and third lens group G3 having positive power.

First lens group G1 is configured with first lens element L1. Second lens group G2 is configured with second lens element L2. Third lens group G3 is configured with, in order from the object side to the image side, third lens element L3, fourth lens element L4, and fifth lens element L5.

First lens element L1 is a glass lens having negative power and is a negative meniscus lens convex toward the object side.

First lens element L1 has an aspherical shape on each of the convex surface on the object side and the concave surface on an image plane side.

The convex surface on the object side of first lens element L1 is an aspherical surface having stronger positive power at positions farther from an optical axis. The concave surface on the image plane side is an aspherical surface having stronger negative power at positions farther from the optical axis.

Second lens element L2 is a glass lens having positive power and is a positive meniscus lens convex toward the image plane side.

Second lens element L2 has an aspherical shape on each of the concave surface on the object side and the convex surface on the image plane side.

A concave surface on the object side of second lens element L2 is an aspherical surface having stronger negative power at positions farther from the optical axis. The convex surface on the image plane side is an aspherical surface having stronger positive power at positions farther from the optical axis.

Third lens element L3 is a glass lens having negative power and is a biconcave lens.

Fourth lens element L4 is a glass lens having positive power and is a biconvex lens.

Fifth lens element L5 is a glass lens having negative power and is a negative meniscus lens convex toward the image plane side.

Expanded Examples of First to Tenth Exemplary Embodiments

As described above, the first to tenth exemplary embodiments have been described as illustrative examples of the technique disclosed in the present application. However, the technique of the present disclosure can be applied not only to the above exemplary embodiments but also to exemplary embodiments in which modification, replacement, addition, or removal is appropriately made.

For example, instead of the lens material exemplified in the first to tenth exemplary embodiments, the following materials can also be used. This is because relative refractive index temperature coefficients of the following materials for light in a wavelength range from 580 nm to 640 nm in air in a range from 0° C. to 20° C. satisfy a predetermined condition.

Hereinafter, examples of an alternative of the positive lenses will be described.

Positive lens: Manufactured by HOYA CORPORATION FC5, FCD100, FCD10A, FCD10, FCD1, FCD505, FCD515, LBC3N, M-FCD1, M-FCD500, M-FDS910, M-PCD4, M-PCD51, PCD4, PCD51

Positive lens: Manufactured by SUMITA OPTICAL GLASS, Inc. K-CaFK95, K-FK5, K-GFK68, K-GFK70, K-LaFK60, K-PFK80, K-PFK85, K-PFK90, K-PG325, K-PG375, K-PSK300, K-PSKn2

Positive lens: Manufactured by OHARA INC. S-BAL2, S-BAL3, S-FPL51, S-FPL53, S-FPM2, S-FPM3, S-FSL5, S-LAM3, S-PHM52, S-PHM53

Hereinafter, examples of an alternative of the negative lenses will be described.

Negative lens: Manufactured by HOYA CORPORATION BACD15, BACD18, BAF10, E-ADF10, E-FD1, E-FD4, E-FDS2, FDS18, FDS90, LAC8, LAC9, M-FDS910, NBF1, TAFD30, TAFD33, TAFD40

Negative lens: Manufactured by SUMITA OPTICAL GLASS, Inc. K-CD120, K-CSK120, K-LaF3, K-LaFK55, K-LaFn1, K-LaFn11, K-LaFn5, K-LaSFn6, K-LaSKn1, K-PSFn2, K-SFLD66, K-SK18, K-VC100, K-VC78, K-VC79

Negative lens: Manufactured by OHARA INC. S-BAL11, S-BSM10, S-BSM15, S-BSM9, S-LAH52, S-LAH53, S-LAH58, S-LAH66, S-LAH79, S-LAL10, S-LAL12, S-LAL14, S-LAL58, S-LAL61, S-LAM51, S-NPH1, S-NSL5, S-TIH53, S-TIL2

The examples of an alternative are described above, but various materials other than the above materials can be used as long as the materials meet the purpose.

(Condition and Advantageous Effect)

Hereinafter, a description will be given on such conditions that it is beneficial for an imaging lens system, for example, the imaging lens systems according to the first to tenth exemplary embodiments to satisfy. Note that a plurality of beneficial conditions are set for the imaging lens systems of the exemplary embodiments, and a configuration of an imaging lens system satisfying all of the conditions is the most effective. However, by satisfying each condition, it is possible to obtain the imaging lens system providing an effect corresponding to the condition.

For example, as in the imaging lens systems according to the first to tenth exemplary embodiments, an imaging lens system in the present disclosure consists of, in order from an object side to an image side: a first lens group having negative power and consisting of at least one negative lens element; an aperture diaphragm; a second lens group having positive power and configured with a single lens element; and a third lens group having power. The third lens group includes a lens element having positive power and a lens element having negative power. Hereinafter, this lens configuration is referred to as a basic configuration of an exemplary embodiment.

In addition, an imaging lens system having the basic configuration desirably satisfies conditions (1) and (2) shown below.

$$-1.2 \times 10^{-5} < dn/dt_{pi} < 0, \text{ where } i \geq 1 \quad (1)$$

$$-1.0 \times 10^{-6} < dn/dt_{mi} < 1.5 \times 10^{-5}, \text{ where } i \geq 1 \quad (2)$$

where $dn/dt_{pi}$ is a relative refractive index temperature coefficient, of an i-th lens element having positive power included in an entire system, for light in a wavelength range from 580 nm to 640 nm in air in a range from 0° C. to 20° C., and $dn/dt_{mi}$ is a relative refractive index temperature coefficient, of an i-th lens element having negative power included in the entire system, for light in a wavelength range from 580 nm to 640 nm in air in a range from 0° C. to 20° C.

The conditions (1) and (2) are respectively conditions for specifying appropriate relative refractive index temperature coefficients, in air, of the positive lens elements and the negative lens elements included in the entire system. By satisfying the conditions (1) and (2), it is possible to reduce defocus in the optical axis direction caused by a change in a refractive index when temperature changes.

Note that a defocus amount in the optical axis direction caused by the change in the refractive indices of the lens elements when temperature changes desirably satisfies the following value.

$$0 < dBF/BF < 1.0 \times 10^{-4} \quad (a)$$

where dBF is a defocus amount in the optical axis direction caused by a change in a refractive index of each lens element for a change in temperature of 1° C., and BF is an air equivalent length of a back focus of an imaging lens.

A camera having an imaging lens system is configured with a plurality of lens elements, a lens barrel holding the lens elements, and an imaging device. When a temperature of an environment in which the camera is installed changes, refractive indices of the lens elements change, and distances between the lens elements change due to thermal expansion and contraction of the lens barrel, whereby the back focus of the imaging lens changes. Therefore, defocus is caused in the optical axis direction. The conditional expression (a) represents a preferable condition to be satisfied by the back focus of the imaging lens and the defocus amount in the optical axis direction caused by the changes in the refractive indices of the lens elements, in order to reduce deterioration of performance caused by the defocus in the optical axis direction occurring in the camera when the temperature changes.

An imaging lens system according to first to tenth numerical examples to be described below satisfy the conditions (1) and (2); therefore, the condition (a) is satisfied.

Preferably, by satisfying any one of or both of conditions (1a) and (1b), the above effect can be more successfully provided.

$$-1.0 \times 10^{-5} < dn/dt_{pi}, \text{ where } i \geq 1 \quad (1a)$$

$$dn/dt_{pi} < -1.5 \times 10^{-7}, \text{ where } i \geq 1 \quad (1b)$$

Further, by satisfying any one of or both of conditions (2a) and (2b), the above effect can be more successfully provided.

$$-5.0 \times 10^{-7} < dn/dt_{mi}, \text{ where } i \geq 1 \quad (2a)$$

$$dn/dt_{mi} < 1.0 \times 10^{-5}, \text{ where } i \geq 1 \quad (2b)$$

Further, an imaging lens system having the basic configuration desirably satisfies condition (3) shown below.

$$0.1 < f/f_2 < 1.2 \quad (3)$$

where f is a focal length of the entire system at a d-line, and $f_2$ is a focal length of the second lens group at the d-line.

The condition (3) is a condition for specifying a ratio of the power of the second lens group with respect to the power of the entire system. By satisfying the condition (3), it is possible to keep the power of the second lens group to be appropriate and thus to reduce defocus in the optical axis direction caused by a change in the refractive index when temperature changes.

Preferably, by satisfying any one of or both of conditions (3a) and (3b) shown below, the above effect can be more successfully provided.

$$0.2 < f/f_2 \quad (3a)$$

$$f/f_2 < 0.9 \quad (3b)$$

Further, an imaging lens system having the basic configuration desirably satisfies condition (4) shown below.

$$-0.2 < f/f_{12} < 1.5 \quad (4)$$

where f is the focal length of the entire system at the d-line, and $f_{12}$ is a composite focal length at the d-line of the first lens group and the second lens group.

The condition (4) is a condition for specifying a ratio of a composite power of the first lens group and the second lens group with respect to the power of the entire system. By satisfying the condition (4), it is possible to downsize the optical system. If a lower limit of the condition (4) is equal to or less than, it is difficult to downsize the optical system. Alternatively, if an upper limit is equal to or higher than, the composite power of the first lens group and the second lens group is too large to appropriately correct aberrations.

Preferably, by satisfying any one of or both of conditions (4a) and (4b) shown below, the above effect can be more successfully provided.

$$-0.15 < f/f_{12} \quad (4a)$$

$$f/f_{12} < 1.0 \quad (4b)$$

Further, an imaging lens system having the basic configuration desirably satisfies condition (5) shown below.

$$v_{1mi} > 35, \text{ where } i \geq 1 \quad (5)$$

where $v_{1mi}$ is an Abbe number at the d-line of the i-th lens element having negative power included in the first lens group.

The condition (5) is a condition for specifying a range of an appropriate Abbe number of the negative lens element included in the first lens group. By satisfying the condition (5), it is possible to mainly correct chromatic aberration of magnification. If the lower limit of the condition (5) is equal to or less than, it is difficult to appropriately correct chromatic aberration of magnification.

Preferably, by satisfying the condition (5a) shown below, the above effect can be more successfully provided.

$$v_{1mi} > 40, \text{ where } i \geq 1 \quad (5a)$$

Further, an imaging lens system having the basic configuration desirably satisfies conditions (6) and (7) shown below.

$$\nu_{3pi} > 50, \text{ where } i \geq 1 \quad (6)$$

$$\nu_{3mi} < 35, \text{ where } i \geq 1 \quad (7)$$

where $\nu_{3pi}$ is an Abbe number at the d-line of the i-th lens element having positive power included in the third lens group, and $\nu_{3mi}$ is an Abbe number at the d-line of the i-th lens element having negative power included in the third lens group.

The conditions (6) and (7) are respectively conditions for specifying the ranges of appropriate Abbe numbers of the positive lens element and the negative lens element included in the third lens group. By satisfying the conditions (6) and (7), it is possible to increase radiuses of curvature of the lenses constituting the third lens group. Therefore, it is possible to reduce inclination angles, of the lenses constituting the third lens group, in the peripheral areas of the lenses, and it is thus possible to reduce difficulty in manufacturing the lenses, whereby the lenses can be low-cost.

Preferably, by satisfying either condition (6a) or (7a) shown below, the above effect can be more successfully provided.

$$\nu_{3pi} > 60, \text{ where } i \geq 1 \quad (6a)$$

$$\nu_{3mi} < 32, \text{ where } i \geq 1 \quad (7a)$$

Further, an imaging lens system having the basic configuration desirably satisfies condition (8) shown below.

$$-0.3 < f/f_3 < 1.0 \quad (8)$$

where f is the focal length of the entire system at the d-line, and
$f_3$ is a focal length of the third lens group at the d-line.

The condition (8) is a condition for specifying a ratio of the power of the third lens group with respect to the power of the entire system. By satisfying the condition (8), it is possible to keep an incident angle of light into the image plane (imaging device) to be in an appropriate range. If the lower limit of the condition (8) is equal to or less than, the incident angle of light into the image plane (imaging device) cannot be appropriately gentle. Alternatively, if the upper limit is equal to or higher than, the power of the third lens group is too large to appropriately correct aberrations.

Preferably, by satisfying any one of or both of conditions (8a) and (8b) shown below, the above effect can be more successfully provided.

$$-0.2 < f/f_3 \quad (8a)$$

$$f/f_3 < 0.8 \quad (8b)$$

Eleventh Exemplary Embodiment: Camera and Vehicle

A camera including the imaging lens system according to the first exemplary embodiment will be described, with an on-vehicle camera taken as an example. Note that in the on-vehicle camera, instead of the imaging lens system according to the first exemplary embodiment, any one of the imaging lens systems according to the second to tenth exemplary embodiments may be applied.

Figure 21:
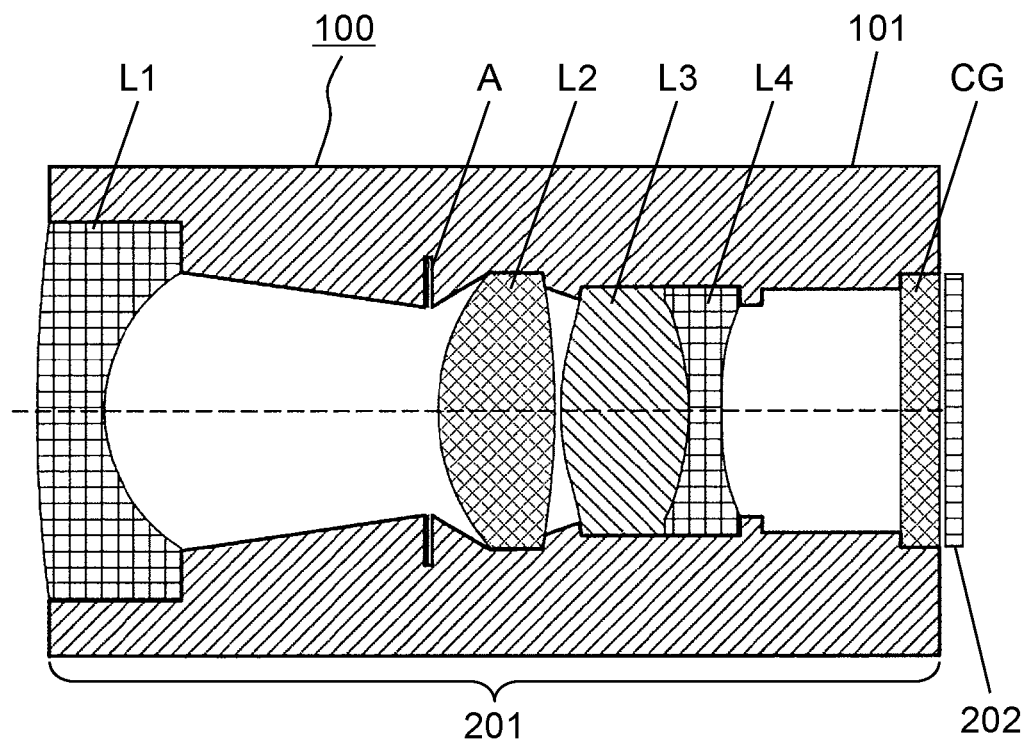
FIG. 21 is a schematic diagram of an on-vehicle camera equipped with the imaging lens system according to the first exemplary embodiment.

FIG. 21 is a schematic diagram of the on-vehicle camera including the imaging lens system according to the first exemplary embodiment, and on-vehicle camera 100 includes: imaging lens system 201; imaging device 202 that images light converged by imaging lens system 201; and lens frame 101 holding lens system 201 and imaging device 202. Imaging device 202 is disposed at a position of image plane S in the imaging lens system according to the first exemplary embodiment.

On-vehicle camera 100 is installed in a vehicle and is used as a sensing camera or a view camera. An image taken by the sensing camera is used to check an inter-vehicle distance to another vehicle and the like. An image taken by the view camera is displayed on a monitor in the vehicle to be used for the driver to see ahead of the vehicle or behind the vehicle.

The imaging lens system of the present disclosure is a lens system that has a horizontal angle of view of about 60° and is made in consideration of temperature characteristics; therefore, defocus associated with a temperature change can be reduced as much as possible in comparison with conventional lens systems, whereby the imaging lens system is effective as a lens system for a view camera.

When the temperature of an environment in which on-vehicle camera 100 is installed changes, lens frame 101 accordingly expands or contracts in the optical axis direction. In particular, if the material of lens frame 101 is resin, lens frame 101 significantly expands and contracts. Since the lens elements are held on lens frame 101, the expansion and contraction of lens frame 101 makes the back focus change, thereby causing defocus. Since the present exemplary embodiment satisfies the above-mentioned condition (a), it is possible to set the relative refractive index temperature coefficients of the negative-power lens elements and the relative refractive index temperature coefficients of the positive-power lens elements to appropriately deal with the expansion and contraction of lens frame 101.

This arrangement makes it possible to achieve an optical system in which a change in the back focus is kept in a predetermined range even when the change in the environment temperature makes the length of lens frame 101 change in the optical axis direction. Therefore, even in the case where it is required to deal with a severe temperature environment from low temperatures to high temperatures as in vehicles, it is possible to achieve an on-vehicle camera having high optical performance.

Next, a vehicle in the present disclosure will be described, with a vehicle equipped with on-vehicle cameras 100 taken as example.

Figure 22:
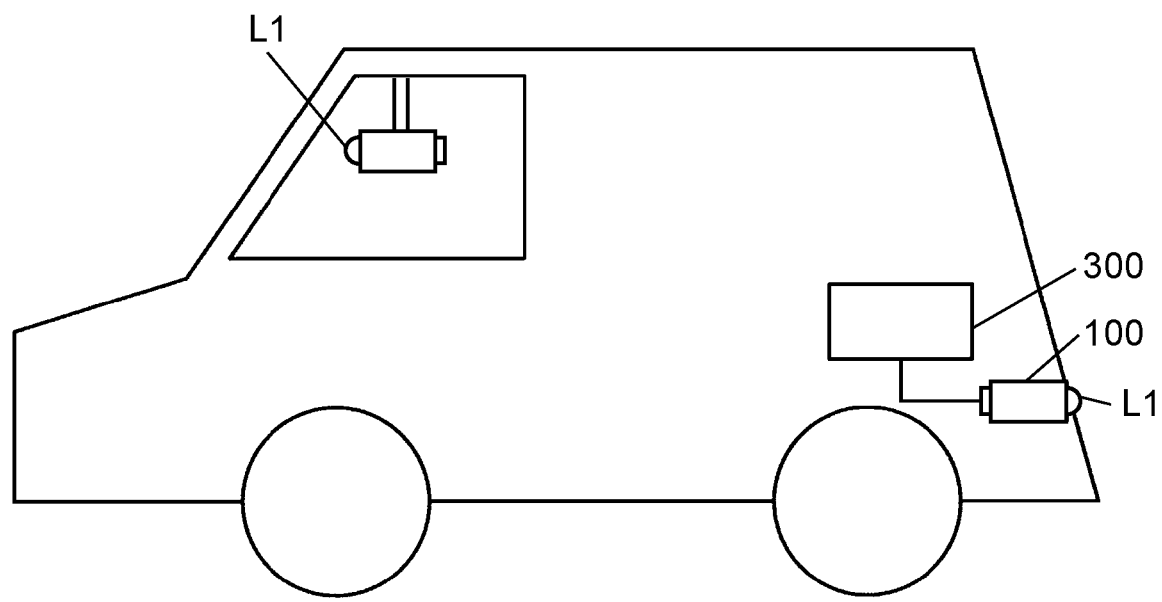
FIG. 22 is a schematic diagram of a vehicle equipped with on-vehicle cameras each at a front side position and on a rear side position of a vehicle.

FIG. 22 is a schematic diagram of a vehicle equipped with cameras, one on a front side position (near a windshield) and the other on a rear side position (near a rear bumper) of the vehicle. The vehicle includes: on-vehicle camera 100 on the rear side position of the vehicle; and processing unit (CPU) 300 that detects an external environment on the basis of a picked-up image obtained by imaging device 202 provided on on-vehicle camera 100 and that controls various parts.

Imaging device 202 receives an optical image formed by imaging lens system 201 and converts the optical image into an electric image signal. CPU 300 acquires the image signal to check whether there is a pedestrian or an obstacle, and notifies the driver of the presence of a pedestrian or an obstacle or performs other processes, depending on a result of the check.

As described above, the imaging lens system of the present disclosure is effective as a lens system for a view camera but can be used also as a lens system for a sensing camera.

As described above, the eleventh exemplary embodiment has been described as an example of the technique disclosed in the present application. However, the technique of the present disclosure can be applied not only to the above exemplary embodiments but also to exemplary embodiments in which modification, replacement, addition, or removal is appropriately made.

Note that as the eleventh exemplary embodiment, an example has been shown in which the imaging lens system according to the first to tenth exemplary embodiments in the present disclosure was applied to an on-vehicle camera as a sensing camera or a view camera; however, it is a matter of course that the imaging lens system of the present disclosure can be applied to a surveillance camera in a surveillance system, a web camera, and other cameras.

Numerical Examples

Hereinafter, a description will be given on numerical examples implemented in the imaging lens systems according to the first to tenth exemplary embodiments. Note that in the numerical examples, the lengths in the tables are all in the unit of "mm", and the angles of view are all in the unit of "°". Note that the expression "angle of view" in the tables represents a diagonal half angle of view. In each numerical example, r is a radius of curvature, d is a distance between surfaces, nd is a refractive index at the d-line, vd is the Abbe number at the d-line, dn/dt is a relative refractive index temperature coefficient for light in the wavelength range from 580 nm to 640 nm in air in a range from 0° C. to 20° C. Further, in the numerical examples, the surfaces marked with * are aspherical, and the aspherical shapes are defined by the following equation.

[Mathematical Expression 1]

$$Z = \frac{h^2/r}{1+\sqrt{1-(1+\kappa)(h/r)^2}} + \sum A_n h^n$$

where

Z is a distance from a point on the aspherical surface whose height from the optical axis is h to a tangent plane at a top of the aspherical surface, h is a height from the optical axis, r is a radius of curvature of the top, κ is a conical coefficient, and $A_n$ is an n-th order aspherical surface coefficient.

FIGS. 2, 4, 6, 8, 10, 12, 14, 16, 18, and 20 are respectively longitudinal aberration diagrams of imaging lens systems according to the first to tenth numerical examples in the infinity focusing state.

In each longitudinal aberration diagram, in order from the left side, there are shown a spherical aberration (SA (mm)), an astigmatism (AST (mm)), and a distortion (DIS (%)).

In each spherical aberration diagram, the vertical axis represents the F number (represented by F, in the drawing). The solid line, the short broken line, and the long broken line respectively represent the characteristics for the d-line, an F-line, and a C-line.

In each astigmatism diagram, the vertical axis represents the image height. The solid line and the broken line respectively represent the characteristics in the sagittal plane (represented by s, in the drawing) and in the meridional plane (represented by m, in the drawing). Note that, w represents the half angle of view.

In each distortion diagram, the vertical axis represents the image height, and w represents the half angle of view.

Here, in the first to eighth and tenth examples, each of the drawings shows the aberration, assuming Y=f·tan(ω) as the ideal image height (Y is the image height, and f is the focal length of the entire system).

In the ninth example, the drawing shows the aberration, assuming Y=2·f·tan(ω/2) as the ideal image height (stereographic projection method) (Y is the image height, and f is the focal length of the entire system).

First Numerical Example

The imaging lens system according to the first numerical example corresponds to the first exemplary embodiment shown in FIG. 1.

TABLE 2

Surface Data

| Surface Number | r | d | nd | vd | dn/dt |
|---|---|---|---|---|---|
| Object Plane | ∞ | | | | |
| 1 | 24.85950 | 1.25000 | 1.67790 | 55.5 | 9.0E−07 |
| 2 | 2.98260 | 6.05000 | | | |
| 3 (Aperture Diaphragm) | ∞ | 0.20000 | | | |
| 4 | 3.80740 | 2.20000 | 1.59282 | 68.7 | −5.7E−06 |
| 5 | −13.93880 | 0.10000 | | | |
| 6* | 4.91050 | 2.40000 | 1.55332 | 71.7 | −5.7E−06 |
| 7* | −3.60330 | 0.60000 | 1.82115 | 24.1 | −2.0E−07 |
| 8* | 14.53910 | 3.35580 | | | |
| 9 | ∞ | 0.70000 | 1.51680 | 64.1 | 2.2E−06 |
| 10 | ∞ | 0.10000 | | | |
| Image Plane | ∞ | | | | |

TABLE 3

Aspherical Surface Data

Surface 6

K = −1.75927E+00, A4 = −1.52095E−03, A6 = 1.79405E−04,
A8 = −2.78274E−04 A10 = 4.26340E−05, A12 = −4.20364E−06

Surface 7

K = −3.84102E−01, A4 = 3.30925E−02, A6 = −1.52283E−02,
A8 = 5.35031E−03 A10 = −1.10531E−03, A12 = 8.11179E−05

Surface 8

K = 1.15789E+01, A4 = 2.01859E−02, A6 = −5.08517E−03,
A8 = 1.79353E−03 A10 = −3.23303E−04, A12 = 1.37551E−05

TABLE 4

Various Data

| | |
|---|---|
| Focal length | 3.3892 |
| F number | 1.99691 |
| Half angle of view | 36.5200 |
| Image height | 2.2406 |
| Overall lens length | 16.9464 |
| Entrance pupil position | 3.6170 |
| Exit pupil position | −6.6966 |
| Front principal point position | 5.2885 |
| Rear principal point position | 13.5572 |

TABLE 5

Lens Element Data

| Lens | Front surface | Focal length |
|---|---|---|
| 1 | 1 | −5.1177 |
| 2 | 4 | 5.2886 |
| 3 | 6 | 4.1753 |
| 4 | 7 | −3.4649 |

Second Numerical Example

Figure 3:
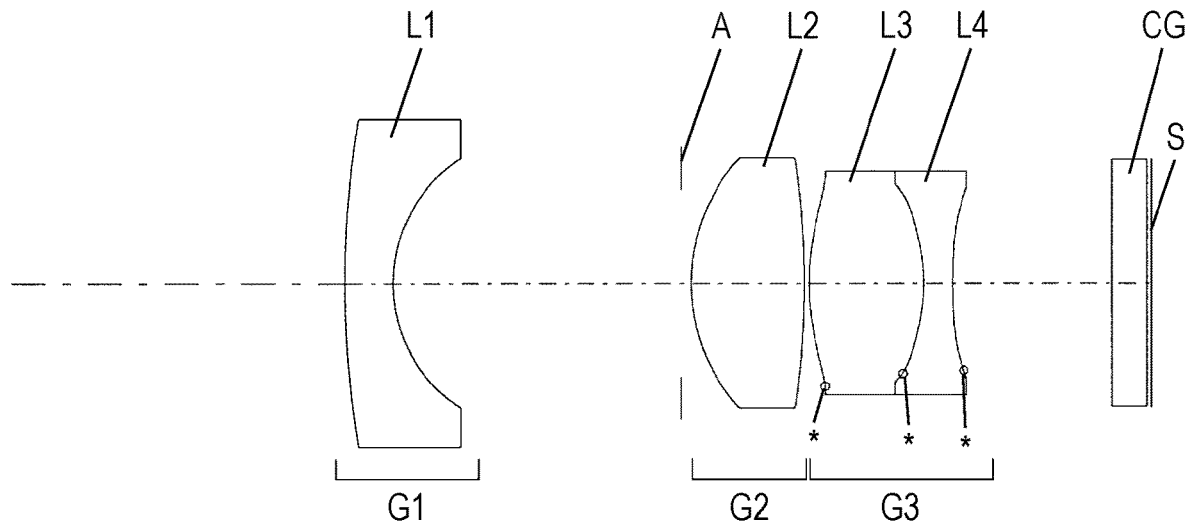
FIG. 3 is a lens arrangement diagram showing an imaging lens system according to a second exemplary embodiment (a second numerical example) in an infinity focusing state.
Figure 4:
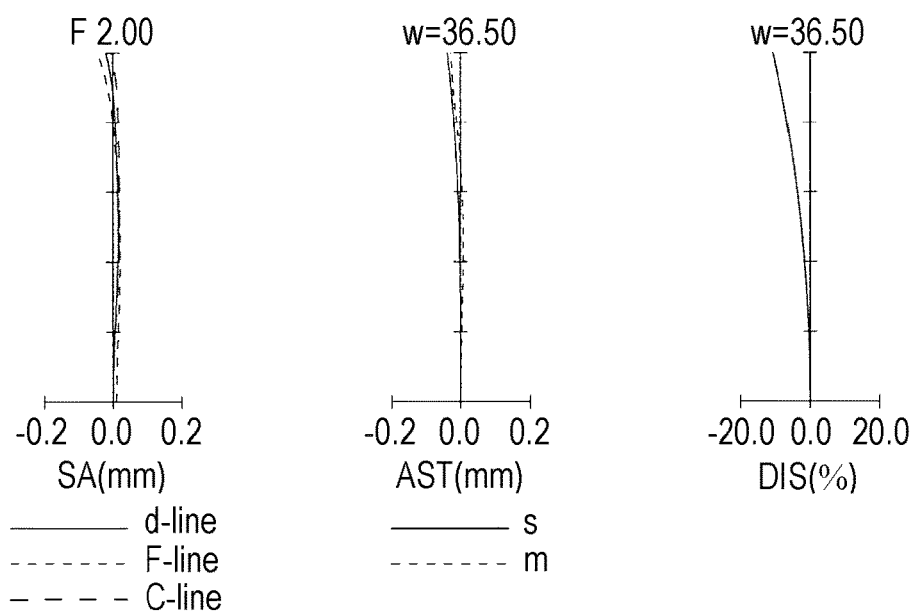
FIG. 4 is a longitudinal aberration diagram of the imaging lens system according to the second numerical example at an infinity focusing state.

The imaging lens system according to the second numerical example corresponds to the second exemplary embodiment shown in FIG. 3.

TABLE 6

Surface Data

| Surface Number | r | d | nd | vd | dn/dt |
|---|---|---|---|---|---|
| Object Plane | ∞ | | | | |
| 1 | 20.39790 | 1.00000 | 1.72916 | 54.7 | 3.3E−06 |
| 2 | 3.04670 | 6.05000 | | | |
| 3 (Aperture Diaphragm) | ∞ | 0.21000 | | | |
| 4 | 3.79500 | 2.35000 | 1.61800 | 63.3 | −3.6E−06 |
| 5 | −17.66520 | 0.10000 | | | |
| 6* | 5.12610 | 2.40000 | 1.56907 | 71.3 | −9.4E−06 |
| 7* | −3.40170 | 0.60000 | 1.82115 | 24.1 | −2.0E−07 |
| 8* | 15.51020 | 3.35930 | | | |
| 9 | ∞ | 0.70000 | 1.51680 | 64.1 | 2.2E−06 |
| 10 | ∞ | 0.10000 | | | |
| Image Plane | ∞ | | | | |

TABLE 7

Aspherical Surface Data

Surface 6

K = −1.96859E+00, A4 = −1.68460E−03, A6 = 1.62125E−04,
A8 = −2.73929E−04 A10 = 4.44138E−05, A12 = −4.21360E−06

Surface 7

K = −2.95565E−01, A4 = 3.28313E−02, A6 = −1.63720E−02,
A8 = 5.35653E−03 A10 = −1.02426E−03, A12 = 6.30901E−05

Surface 8

K = −1.94395E+00, A4 = 1.94614E−02, A6 = −5.10962E−03,
A8 = 1.76530E−03 A10 = −3.43493E−04, A12 = 2.24435E−05

TABLE 8

Various Data

| | |
|---|---|
| Focal length | 3.3884 |
| F number | 1.99832 |
| Half angle of view | 36.5000 |
| Image height | 2.2424 |
| Overall lens length | 16.8641 |
| Entrance pupil position | 3.4230 |
| Exit pupil position | −6.7676 |
| Front principal point position | 5.1135 |
| Rear principal point position | 13.4757 |

TABLE 9

Lens Element Data

| Lens | Front surface | Focal length |
|---|---|---|
| 1 | 1 | −5.0344 |
| 2 | 4 | 5.2755 |
| 3 | 6 | 4.0016 |
| 4 | 7 | −3.3496 |

Third Numerical Example

Figure 5:
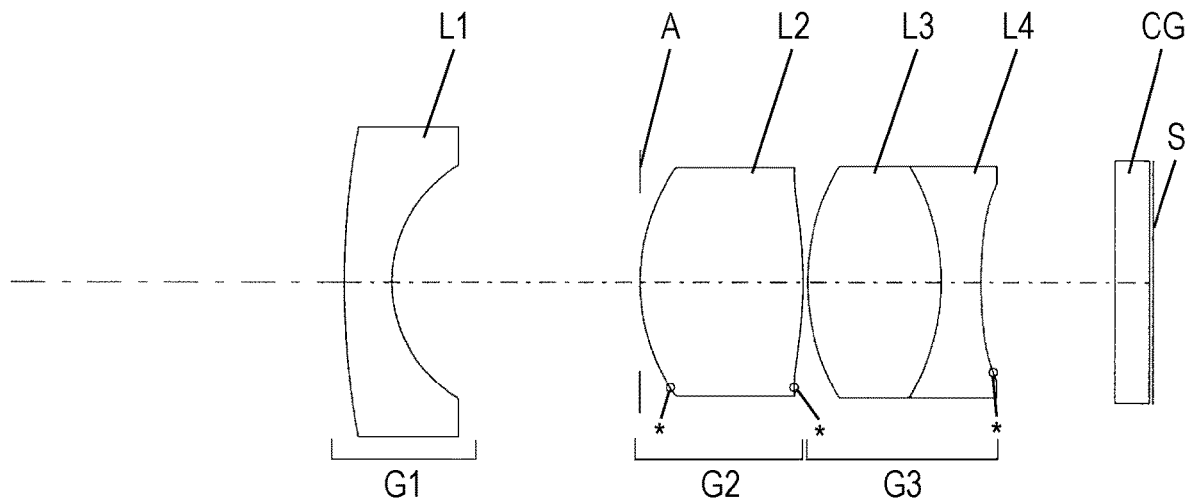
FIG. 5 is a lens arrangement diagram showing an imaging lens system according to a third exemplary embodiment (a third numerical example) in an infinity focusing state.
Figure 6:
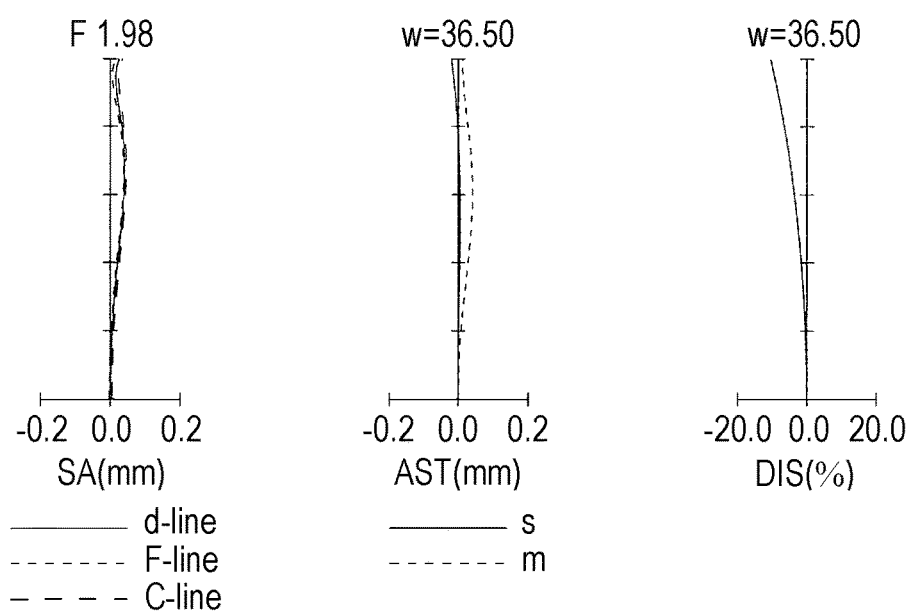
FIG. 6 is a longitudinal aberration diagram of the imaging lens system according to the third numerical example at an infinity focusing state.

The imaging lens system according to the third numerical example corresponds to the third exemplary embodiment shown in FIG. 5.

TABLE 10

Surface Data

| Surface Number | r | d | nd | vd | dn/dt |
|---|---|---|---|---|---|
| Object Plane | ∞ | | | | |
| 1 | 17.75320 | 1.00000 | 1.72916 | 54.7 | 2.6E−06 |
| 2 | 2.82590 | 5.19000 | | | |
| 3 (Aperture Diaphragm) | ∞ | 0.00000 | | | |
| 4* | 4.15730 | 3.40000 | 1.55332 | 71.7 | −5.7E−06 |
| 5* | −8.87160 | 0.10000 | | | |
| 6 | 4.70630 | 2.80000 | 1.59282 | 68.7 | −5.7E−06 |
| 7 | −4.70630 | 0.84000 | 1.82115 | 24.1 | −2.0E−07 |
| 8* | 11.14200 | 2.81390 | | | |
| 9 | ∞ | 0.70000 | 1.51680 | 64.1 | 2.2E−06 |
| 10 | ∞ | 0.10000 | | | |
| Image Plane | ∞ | | | | |

TABLE 11

Aspherical Surface Data

Surface 4

K = −2.10398E−02, A4 = −2.06343E−04, A6 = 5.80482E−05,
A8 = 2.39433E−05 A10 = −2.20384E−06, A12 = −6.29900E−08,
A14 = −6.74156E−09

Surface 5

K = −9.37857E+00, A4 = 7.31715E−04, A6 = 3.84169E−04,
A8 = −7.88239E−05 A10 = 2.24097E−05, A12 = 7.31955E−07,
A14 = −3.22748E−07

Surface 8

K = −1.23853E+02, A4 = 1.93153E−02, A6 = −5.37485E−03,
A8 = 1.77277E−03 A10 = −3.09542E−04, A12 = 2.22329E−05,
A14 = 0.00000E+00

TABLE 12

Various Data

| | |
|---|---|
| Focal length | 3.3761 |
| F number | 1.98128 |
| Half angle of view | 36.5000 |
| Image height | 2.2340 |
| Overall lens length | 16.9165 |
| Entrance pupil position | 3.1601 |
| Exit pupil position | −6.9902 |
| Front principal point position | 4.8992 |
| Rear principal point position | 13.5403 |

TABLE 13

Lens Element Data

| Lens | Front surface | Focal length |
|---|---|---|
| 1 | 1 | −4.7432 |
| 2 | 4 | 5.6403 |
| 3 | 6 | 4.4636 |
| 4 | 7 | −3.9353 |

Fourth Numerical Example

Figure 7:
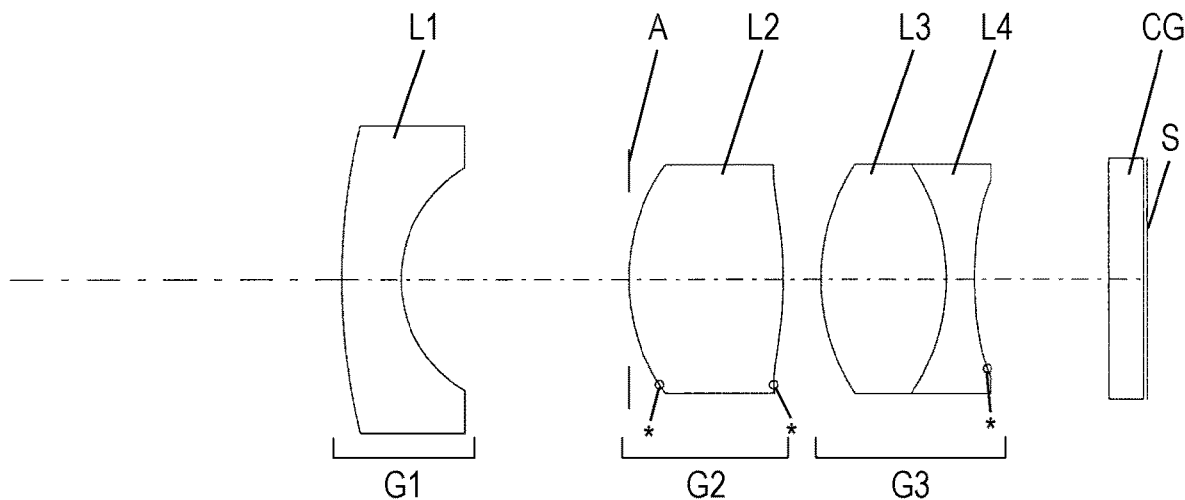
FIG. 7 is a lens arrangement diagram showing an imaging lens system according to a fourth exemplary embodiment (a fourth numerical example) in an infinity focusing state.
Figure 8:
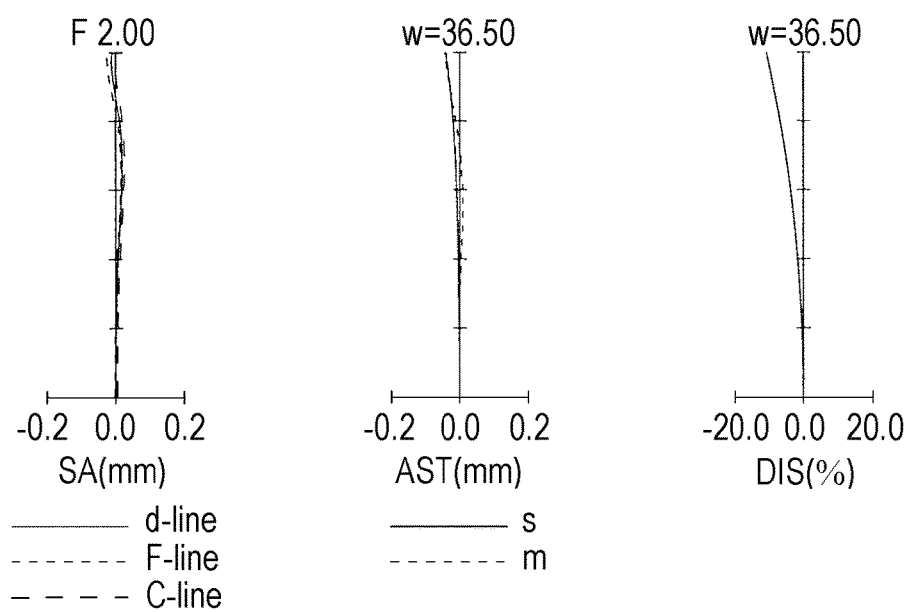
FIG. 8 is a longitudinal aberration diagram of the imaging lens system according to the fourth numerical example at an infinity focusing state.

The imaging lens system according to the fourth numerical example corresponds to the fourth exemplary embodiment shown in FIG. 7.

TABLE 14

Surface Data

| Surface Number | r | d | nd | vd | dn/dt |
|---|---|---|---|---|---|
| Object Plane | ∞ | | | | |
| 1 | 13.60180 | 1.25000 | 1.80420 | 46.5 | 3.9E−06 |
| 2 | 2.69580 | 4.80000 | | | |
| 3 (Aperture Diaphragm) | ∞ | 0.00000 | | | |
| 4* | 4.26940 | 3.25000 | 1.55332 | 71.7 | −5.7E−06 |
| 5* | −8.24610 | 0.80000 | | | |
| 6 | 4.33260 | 2.65000 | 1.61800 | 63.3 | −3.6E−06 |
| 7 | −4.33260 | 0.60000 | 1.82115 | 24.1 | −2.0E−07 |
| 8* | 9.72220 | 2.83540 | | | |
| 9 | ∞ | 0.70000 | 1.51680 | 64.1 | 2.2E−06 |
| 10 | ∞ | 0.10000 | | | |
| Image Plane | ∞ | | | | |

TABLE 15

Aspherical Surface Data

Surface 4

K = 3.27224E−02, A4 = −6.02144E−05, A6 = 7.15236E−05,
A8 = 2.41530E−05 A10 = −1.96383E−06, A12 = −4.26420E−08,
A14 = −5.31044E−09
Surface 5

K = −7.07866E+00, A4 = 5.97417E−04, A6 = 4.65027E−04,
A8 = −7.44752E−05 A10 = 1.92058E−05, A12 = 2.55924E−07,
A14 = −1.77707E−07
Surface 8

K = −1.05829E+02, A4 = 2.06596E−02, A6 = −5.60563E−03,
A8 = 1.70685E−03 A10 = −2.84345E−04, A12 = 1.88378E−05,
A14 = 0.00000E+00

TABLE 16

Various Data

| | |
|---|---|
| Focal length | 3.3935 |
| F number | 1.99613 |
| Half angle of view | 36.5000 |
| Image height | 2.2423 |
| Overall lens length | 16.9797 |
| Entrance pupil position | 3.1657 |
| Exit pupil position | −7.3591 |
| Front principal point position | 4.9931 |
| Rear principal point position | 13.5863 |

TABLE 17

Lens Element Data

| Lens | Front surface | Focal length |
|---|---|---|
| 1 | 1 | −4.4058 |
| 2 | 4 | 5.6020 |
| 3 | 6 | 3.9689 |
| 4 | 7 | −3.5808 |

Fifth Numerical Example

Figure 9:
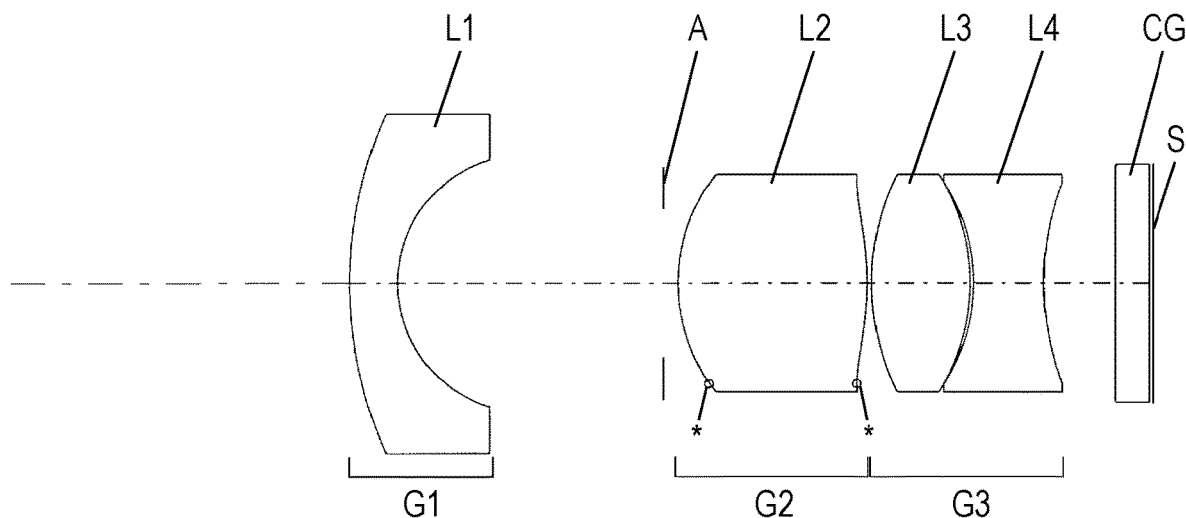
FIG. 9 is a lens arrangement diagram showing an imaging lens system according to a fifth exemplary embodiment (a fifth numerical example) in an infinity focusing state.
Figure 10:
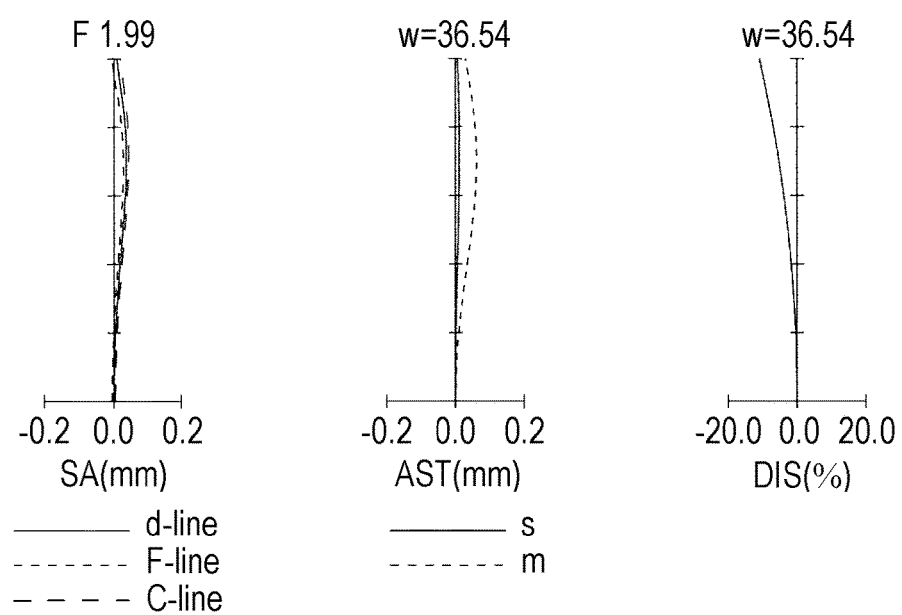
FIG. 10 is a longitudinal aberration diagram of the imaging lens system according to the fifth numerical example at an infinity focusing state.

The imaging lens system according to the fifth numerical example corresponds to the fifth exemplary embodiment shown in FIG. 9.

TABLE 18

Surface Data

| Surface Number | r | d | nd | vd | dn/dt |
|---|---|---|---|---|---|
| Object Plane | ∞ | | | | |
| 1 | 8.80760 | 1.00000 | 1.63854 | 55.4 | 2.4E−06 |
| 2 | 2.73620 | 5.50000 | | | |
| 3 (Aperture Diaphragm) | ∞ | 0.30000 | | | |
| 4* | 3.68470 | 3.90000 | 1.55332 | 71.7 | −5.7E−06 |
| 5* | −6.16780 | 0.10000 | | | |
| 6 | 5.22590 | 2.05000 | 1.59349 | 67.0 | −7.0E−07 |
| 7 | −4.32640 | 0.07500 | | | |
| 8 | −3.92500 | 1.45000 | 1.80518 | 25.5 | 3.0E−07 |
| 9 | 6.07700 | 1.48040 | | | |
| 10 | ∞ | 0.70000 | 1.51680 | 64.1 | 2.2E−06 |
| 11 | ∞ | 0.10000 | | | |
| Image Plane | ∞ | | | | |

TABLE 19

Aspherical Surface Data

Surface 4

K = −1.36753E−01, A4 = −6.77628E−04, A6 = 5.02571E−05,
A8 = 2.90234E−05 A10 = −2.13743E−06, A12 = −4.12303E−07,
A14 = −5.00323E−08
Surface 5

K = −1.03937E+01, A4 = 8.20316E−04, A6 = 4.21977E−04,
A8 = −3.73703E−05 A10 = 3.04891E−05, A12 = 7.47551E−07,
A14 = −6.98262E−07

TABLE 20

Various Data

| | |
|---|---|
| Focal length | 3.3852 |
| F number | 1.98993 |
| Half angle of view | 36.5400 |
| Image height | 2.2324 |
| Overall lens length | 16.6313 |
| Entrance pupil position | 3.8647 |
| Exit pupil position | −5.4104 |
| Front principal point position | 5.1224 |
| Rear principal point position | 13.2461 |

TABLE 21

Lens Element Data

| Lens | Front surface | Focal length |
|---|---|---|
| 1 | 1 | −6.6426 |
| 2 | 4 | 4.8531 |
| 3 | 6 | 4.3346 |
| 4 | 8 | −2.7819 |

Sixth Numerical Example

Figure 11:
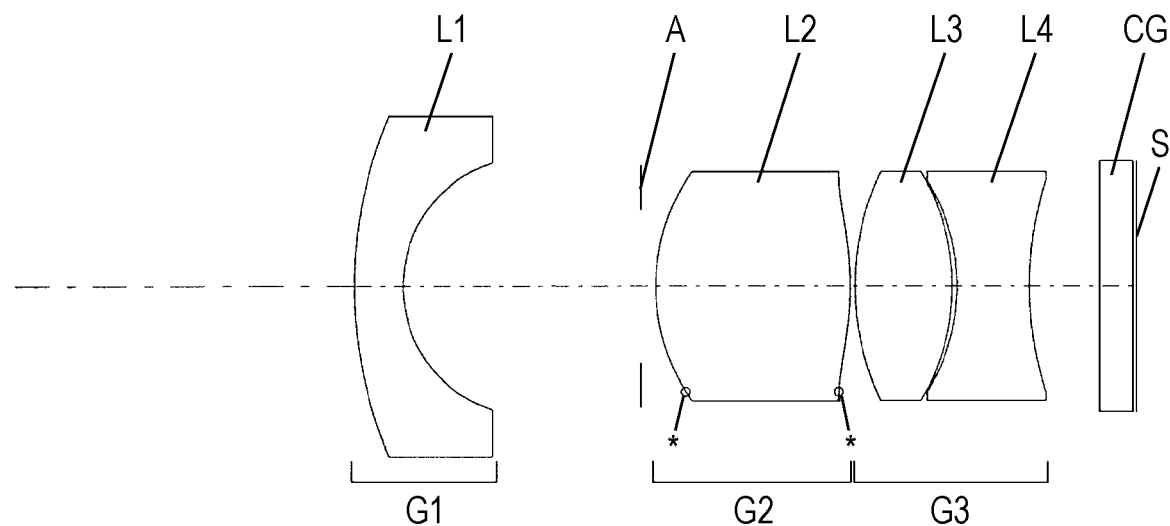
FIG. 11 is a lens arrangement diagram showing an imaging lens system according to a sixth exemplary embodiment (a sixth numerical example) in an infinity focusing state.
Figure 12:
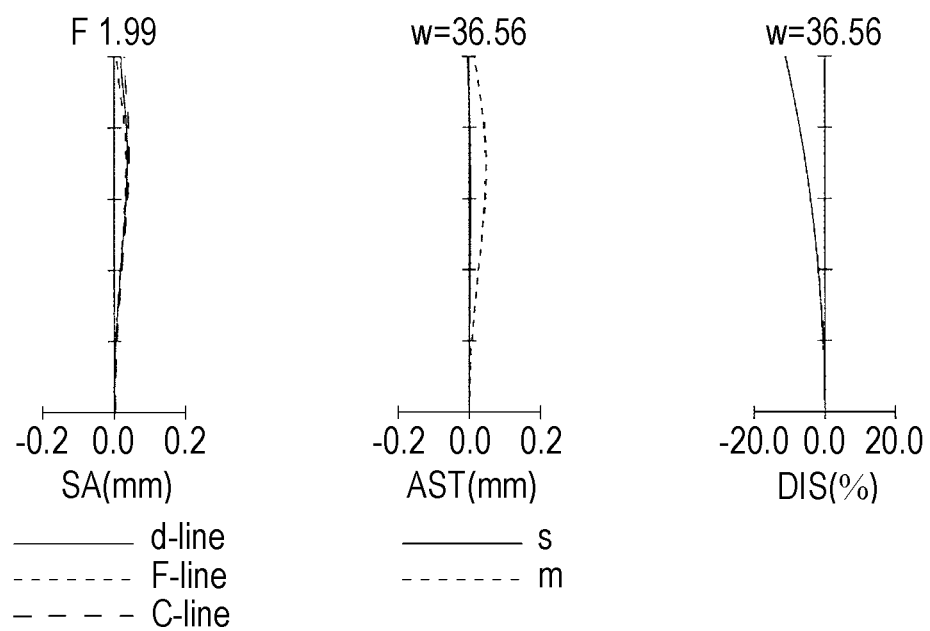
FIG. 12 is a longitudinal aberration diagram of the imaging lens system according to the sixth numerical example at an infinity focusing state.

The imaging lens system according to the sixth numerical example corresponds to the sixth exemplary embodiment shown in FIG. 11.

TABLE 22

Surface Data

| Surface Number | r | d | nd | vd | dn/dt |
|---|---|---|---|---|---|
| Object Plane | ∞ | | | | |
| 1 | 8.57720 | 1.00000 | 1.63930 | 44.9 | 3.0E−06 |
| 2 | 2.59070 | 4.90000 | | | |
| 3 (Aperture Diaphragm) | ∞ | 0.30000 | | | |
| 4* | 3.82210 | 4.00000 | 1.59201 | 67.0 | −7.0E−07 |
| 5* | −6.18180 | 0.10000 | | | |
| 6 | 5.17740 | 2.00000 | 1.59349 | 67.0 | −7.0E−07 |
| 7 | −4.44850 | 0.10000 | | | |
| 8 | −3.98600 | 1.50000 | 1.84666 | 23.8 | 5.0E−07 |
| 9 | 6.89810 | 1.43450 | | | |
| 10 | ∞ | 0.70000 | 1.51680 | 64.1 | 2.2E−06 |
| 11 | ∞ | 0.10000 | | | |
| Image Plane | ∞ | | | | |

TABLE 23

Aspherical Surface Data

Surface 4

K = −1.40809E−01, A4 = −6.95165E−04, A6 = 1.01462E−04, A8 = 2.86248E−05 A10 = −4.81581E−06, A12 = −6.73104E−07, A14 = 4.45934E−08

Surface 5

K = −9.26963E+00, A4 = 8.17404E−04, A6 = 4.66160E−04, A8 = −5.12519E−05 A10 = 2.80953E−05, A12 = 9.69853E−07, A14 = −6.46770E−07

TABLE 24

Various Data

| Focal length | 3.3840 |
|---|---|
| F number | 1.98783 |
| Half angle of view | 36.5600 |
| Image height | 2.2303 |
| Overall lens length | 16.1057 |
| Entrance pupil position | 3.5834 |
| Exit pupil position | −5.4250 |
| Front principal point position | 4.8453 |
| Rear principal point position | 12.7217 |

TABLE 25

Lens Element Data

| Lens | Front surface | Focal length |
|---|---|---|
| 1 | 1 | −6.2107 |
| 2 | 4 | 4.6863 |
| 3 | 6 | 4.3697 |
| 4 | 8 | −2.8064 |

Seventh Numerical Example

Figure 13:
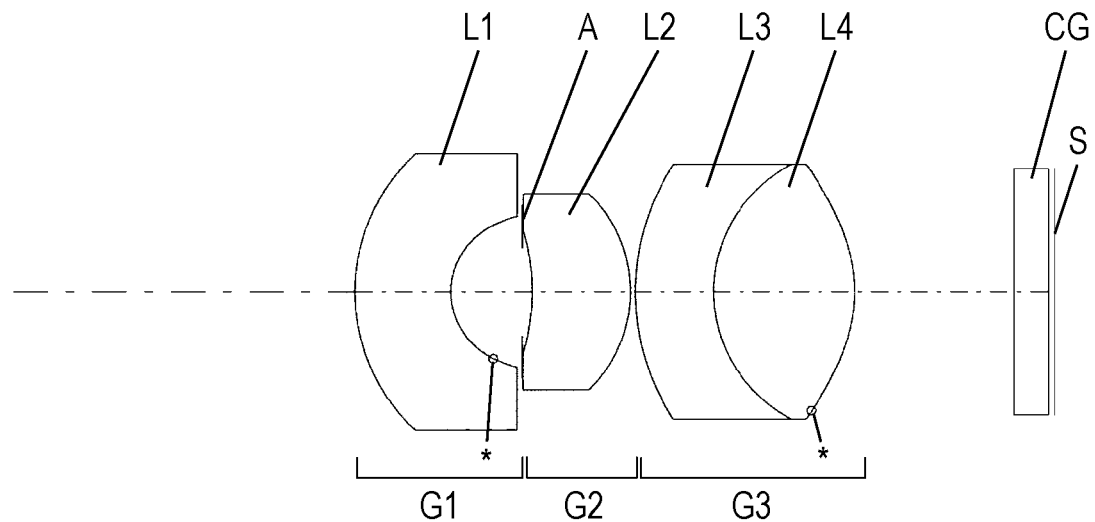
FIG. 13 is a lens arrangement diagram showing an imaging lens system according to a seventh exemplary embodiment (a seventh numerical example) in an infinity focusing state.
Figure 14:
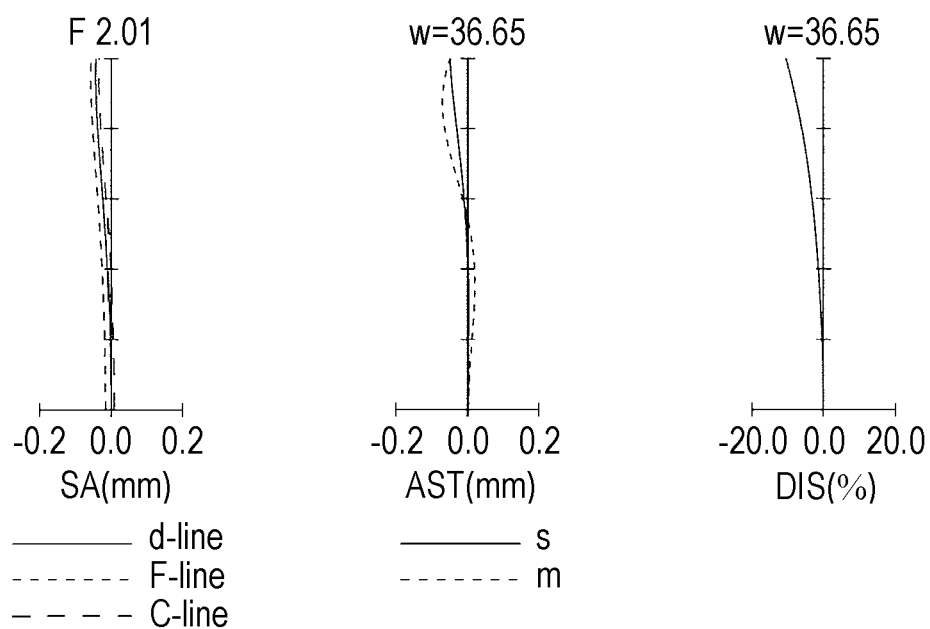
FIG. 14 is a longitudinal aberration diagram of the imaging lens system according to the seventh numerical example at an infinity focusing state.

The imaging lens system according to the seventh numerical example corresponds to the seventh exemplary embodiment shown in FIG. 13.

TABLE 26

Surface Data

| Surface Number | r | d | nd | vd | dn/dt |
|---|---|---|---|---|---|
| Object Plane | ∞ | | | | |
| 1 | 3.99990 | 1.95000 | 1.77250 | 49.5 | 3.7E−06 |
| 2* | 1.55840 | 1.45000 | | | |
| 3 (Aperture Diaphragm) | ∞ | 0.20000 | | | |
| 4 | −4.55010 | 2.00000 | 1.59282 | 68.7 | −5.7E−06 |
| 5 | −2.90570 | 0.10000 | | | |
| 6 | 4.89160 | 1.60000 | 1.94595 | 18.0 | 3.4E−06 |
| 7 | 3.00000 | 2.90000 | 1.55332 | 71.7 | −5.7E−06 |
| 8* | −3.18770 | 3.24840 | | | |
| 9 | ∞ | 0.70000 | 1.51680 | 64.1 | 2.2E−06 |
| 10 | ∞ | 0.10000 | | | |
| Image Plane | ∞ | | | | |

TABLE 27

Aspherical Surface Data

Surface 2

K = −1.34662E−01, A4 = 7.86035E−03, A6 = −9.30686E−03, A8 = 6.81086E−03

Surface 8

K = −6.91910E−01, A4 = 3.98207E−03, A6 = −4.17633E−05, A8 = −5.17118E−06

TABLE 28

Various Data

| Focal length | 3.3786 |
|---|---|
| F number | 2.00760 |
| Half angle of view | 36.6500 |
| Image height | 2.2469 |
| Overall lens length | 14.2863 |
| Entrance pupil position | 3.1120 |
| Exit pupil position | −29.6835 |
| Front principal point position | 6.1066 |
| Rear principal point position | 10.9076 |

TABLE 29

Lens Element Data

| Lens | Front surface | Focal length |
|---|---|---|
| 1 | 1 | −5.0697 |
| 2 | 4 | 9.3363 |

TABLE 29-continued

Lens Element Data

| Lens | Front surface | Focal length |
|---|---|---|
| 3 | 6 | −13.9280 |
| 4 | 7 | 3.3529 |

Eighth Numerical Example

Figure 15:
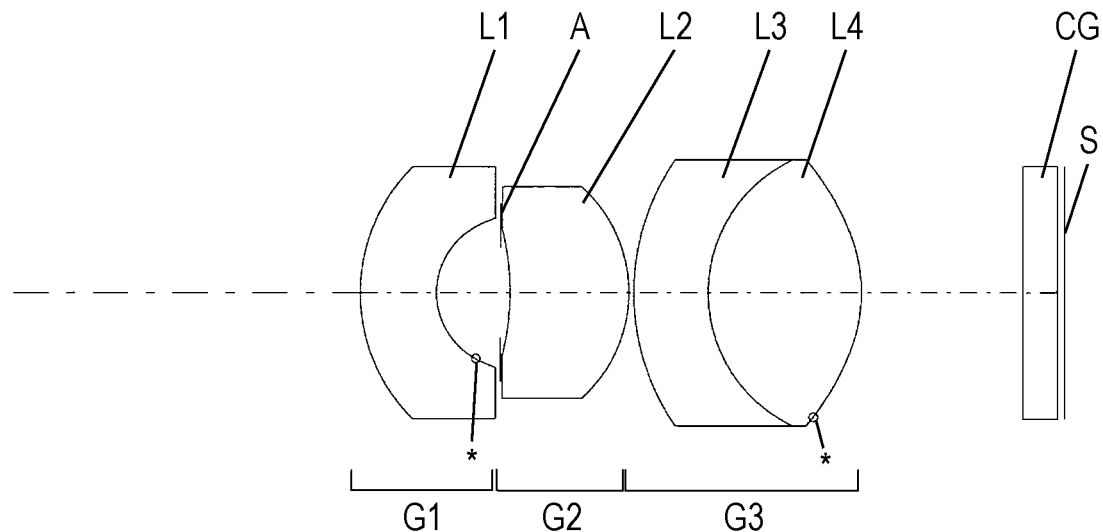
FIG. 15 is a lens arrangement diagram showing an imaging lens system according to an eighth exemplary embodiment (an eighth numerical example) in an infinity focusing state.
Figure 16:
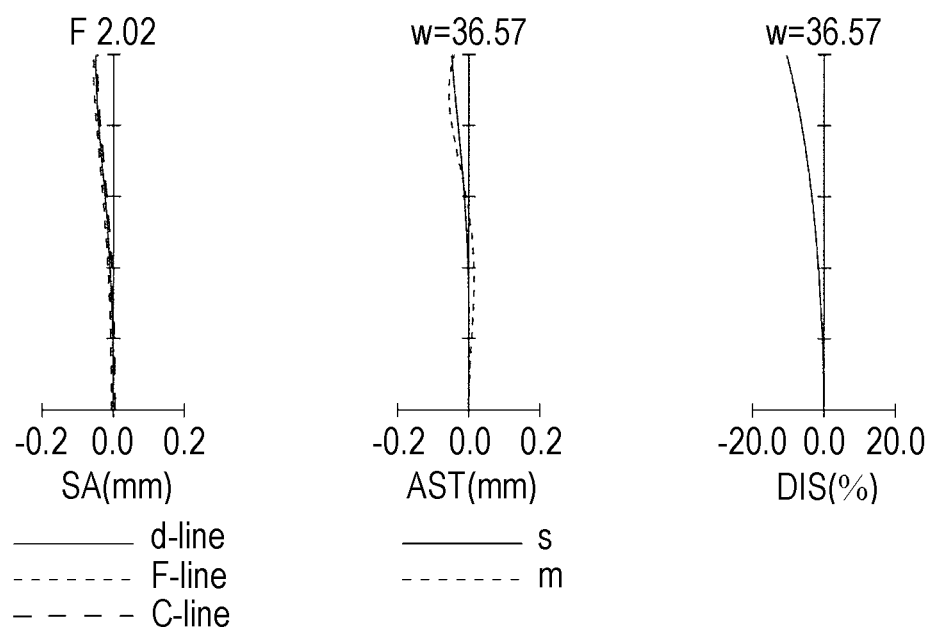
FIG. 16 is a longitudinal aberration diagram of the imaging lens system according to the eighth numerical example at an infinity focusing state.

The imaging lens system according to the eighth numerical example corresponds to the eighth exemplary embodiment shown in FIG. 15.

TABLE 30

Surface Data

| Surface Number | r | d | nd | vd | dn/dt |
|---|---|---|---|---|---|
| Object Plane | ∞ | | | | |
| 1 | 3.63870 | 1.55000 | 1.81000 | 41.0 | 6.7E−06 |
| 2* | 1.53140 | 1.30000 | | | |
| 3 (Aperture Diaphragm) | ∞ | 0.20000 | | | |
| 4 | −5.24730 | 2.40000 | 1.59349 | 67.0 | −7.0E−07 |
| 5 | −2.90410 | 0.10000 | | | |
| 6 | 4.82910 | 1.50000 | 1.94595 | 18.0 | 3.4E−06 |
| 7 | 3.00000 | 3.10000 | 1.49710 | 81.5 | −5.7E−06 |
| 8* | −3.07350 | 3.28170 | | | |
| 9 | ∞ | 0.70000 | 1.51680 | 64.1 | 2.2E−06 |
| 10 | ∞ | 0.10000 | | | |
| Image Plane | ∞ | | | | |

TABLE 31

Aspherical Surface Data

Surface 2

$K = -4.10472E-01, A4 = 2.05437E-02, A6 = -9.08418E-03, A8 = 1.00360E-02$

Surface 8

$K = -5.84187E-01, A4 = 3.94778E-03, A6 = 1.39624E-04, A8 = -2.72380E-05$

TABLE 32

Various Data

| Focal length | 3.3855 |
|---|---|
| F number | 2.02254 |
| Half angle of view | 36.5700 |
| Image height | 2.2465 |
| Overall lens length | 14.2711 |
| Entrance pupil position | 2.5501 |
| Exit pupil position | −45.0947 |
| Front principal point position | 5.6816 |
| Rear principal point position | 10.8857 |

TABLE 33

Lens Element Data

| Lens | Front surface | Focal length |
|---|---|---|
| 1 | 1 | −4.8664 |
| 2 | 4 | 7.9320 |

TABLE 33-continued

Lens Element Data

| Lens | Front surface | Focal length |
|---|---|---|
| 3 | 6 | −13.9237 |
| 4 | 7 | 3.6772 |

Ninth Numerical Example

Figure 17:
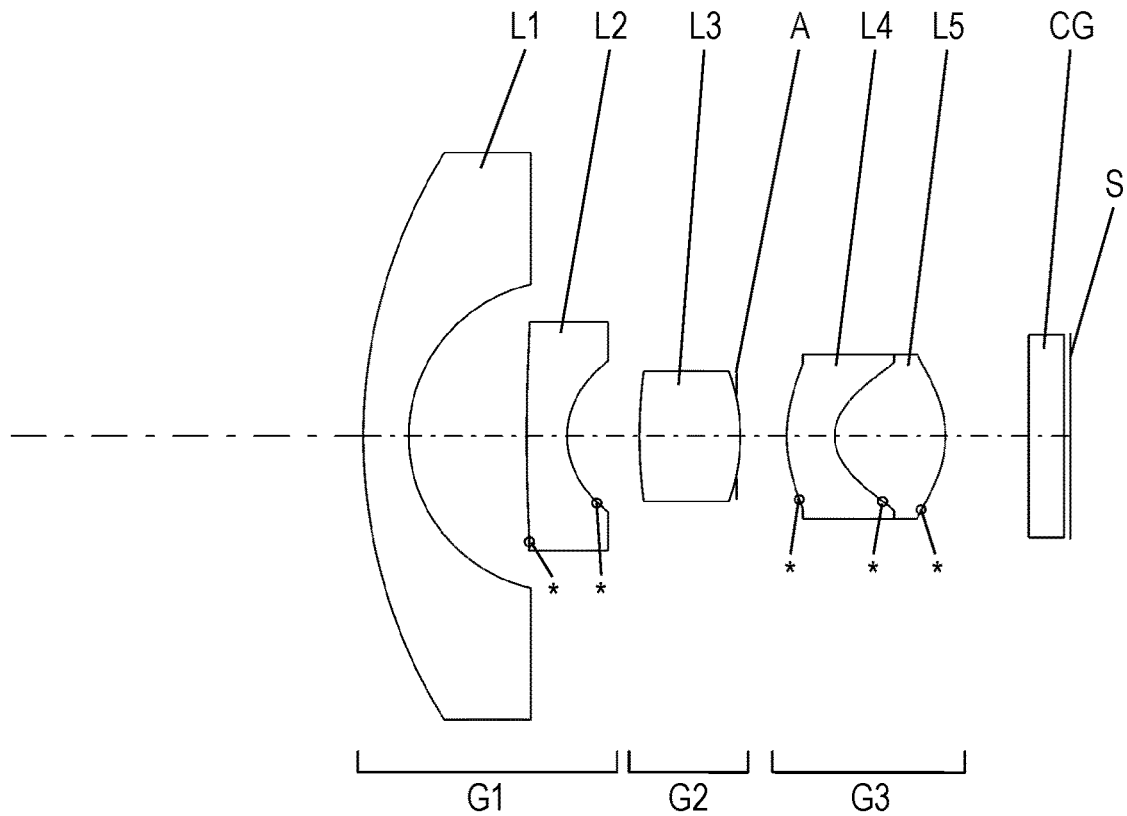
FIG. 17 is a lens arrangement diagram showing an imaging lens system according to a ninth exemplary embodiment (a ninth numerical example) in an infinity focusing state.
Figure 18:
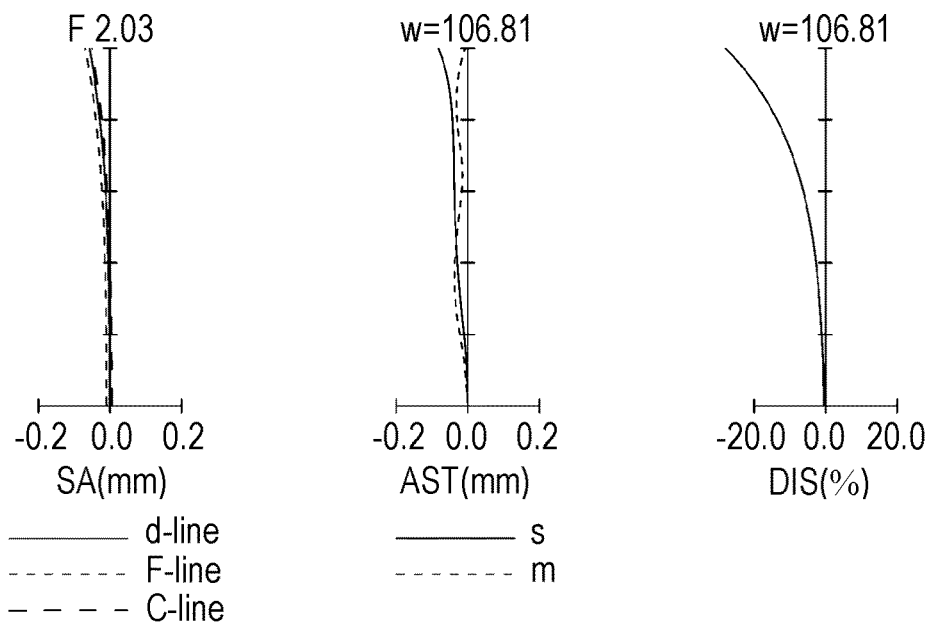
FIG. 18 is a longitudinal aberration diagram of the imaging lens system according to the ninth numerical example at an infinity focusing state.

The imaging lens system according to the ninth numerical example corresponds to the ninth exemplary embodiment shown in FIG. 17.

TABLE 34

Surface Data

| Surface Number | r | d | nd | vd | dn/dt |
|---|---|---|---|---|---|
| Object Plane | ∞ | | | | |
| 1 | 10.87440 | 0.90000 | 1.80420 | 46.5 | 3.9E−06 |
| 2 | 3.12410 | 2.34500 | | | |
| 3* | 47.34530 | 0.80000 | 1.80139 | 45.5 | 6.3E−06 |
| 4* | 1.67670 | 1.43500 | | | |
| 5 | 10.61960 | 2.00000 | 1.80809 | 22.8 | −4.0E−07 |
| 6 | −3.92040 | −0.07500 | | | |
| 7 (Aperture Diaphragm) | ∞ | 1.00000 | | | |
| 8* | 2.87010 | 0.95000 | 1.82115 | 24.1 | −2.0E−07 |
| 9* | 0.86610 | 2.20000 | 1.61881 | 63.9 | −2.9E−06 |
| 10* | −2.10390 | 1.65530 | | | |
| 11 | ∞ | 0.70000 | 1.51680 | 64.1 | 2.2E−06 |
| 12 | ∞ | 0.10000 | | | |
| Image Plane | ∞ | | | | |

TABLE 35

Aspherical Surface Data

Surface 3

$K = 0.00000E+00, A4 = 1.32906E-03, A6 = -2.45416E-04, A8 = -4.29022E-06\ A10 = 0.00000E+00, A12 = 0.00000E+00$

Surface 4

$K = -5.22888E-01, A4 = 3.85150E-04, A6 = 6.91005E-03, A8 = -1.27818E-03\ A10 = 0.00000E+00, A12 = 0.00000E+00$

Surface 8

$K = -9.12636E-01, A4 = -9.63603E-03, A6 = -3.46710E-03, A8 = 2.84322E-03\ A10 = -7.52780E-04, A12 = 0.00000E+00$

Surface 9

$K = -1.10765E+00, A4 = 5.53880E-02, A6 = -5.19066E-02, A8 = 1.98904E-02\ A10 = -1.15014E-03, A12 = -1.09944E-03$

Surface 10

$K = -9.34603E-01, A4 = 9.91918E-04, A6 = 8.34182E-03, A8 = -4.55425E-03\ A10 = 1.14295E-03, A12 = 0.00000E+00$

TABLE 36

Various Data

| Focal length | 0.9755 |
|---|---|
| F number | 2.03068 |
| Half angle of view | 106.8100 |
| Image height | 1.9035 |
| Overall lens length | 14.0432 |
| Entrance pupil position | 3.0155 |

TABLE 36-continued

Various Data

| | |
|---|---|
| Exit pupil position | −14.9998 |
| Front principal point position | 3.9277 |
| Rear principal point position | 13.0677 |

TABLE 37

Lens Element Data

| Lens | Front surface | Focal length |
|---|---|---|
| 1 | 1 | −5.7482 |
| 2 | 3 | −2.1861 |
| 3 | 5 | 3.7754 |
| 4 | 8 | −1.9212 |
| 5 | 9 | 1.3831 |

Tenth Numerical Example

Figure 19:
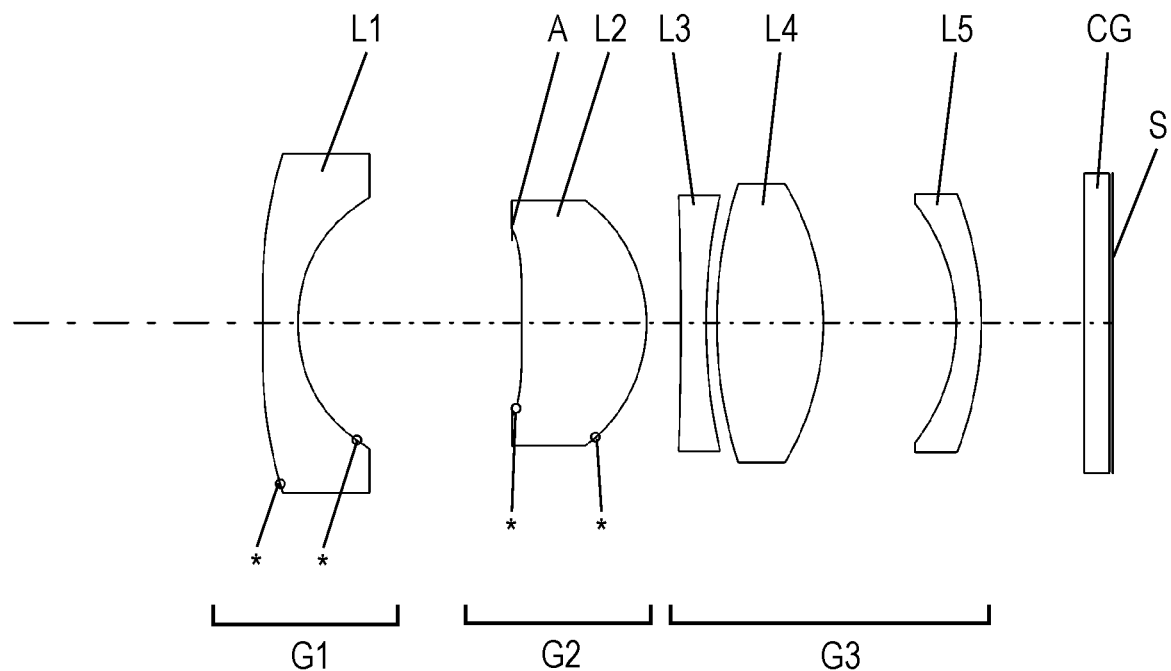
FIG. 19 is a lens arrangement diagram showing an imaging lens system according to a tenth exemplary embodiment (a tenth numerical example) in an infinity focusing state.
Figure 20:
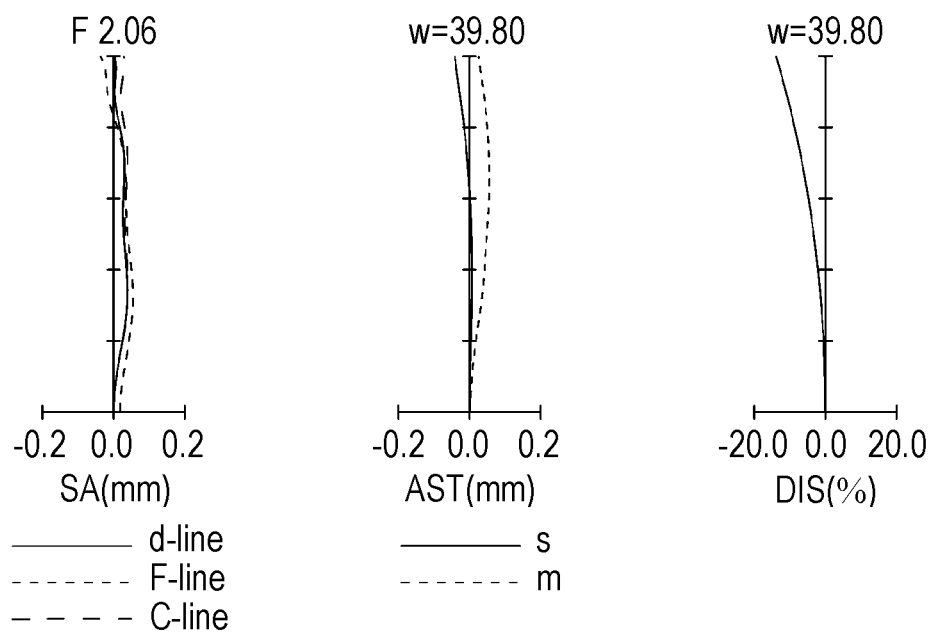
FIG. 20 is a longitudinal aberration diagram of the imaging lens system according to the tenth numerical example at an infinity focusing state.

The imaging lens system according to the tenth numerical example corresponds to the tenth exemplary embodiment shown in FIG. 19.

TABLE 38

Surface Data

| Surface Number | r | d | nd | vd | dn/dt |
|---|---|---|---|---|---|
| Object Plane | ∞ | | | | |
| 1* | 1000.00000 | 1.00000 | 1.58700 | 59.6 | 2.9E−06 |
| 2* | 5.13170 | 6.01390 | | | |
| 3 (Aperture Diaphragm) | ∞ | 0.27480 | | | |
| 4* | −1000.00000 | 3.50000 | 1.55332 | 71.7 | −5.7E−06 |
| 5* | −4.33780 | 0.97570 | | | |
| 6 | −90.79720 | 0.70000 | 1.84666 | 23.8 | 5.0E−07 |
| 7 | 16.63060 | 0.30000 | | | |
| 8 | 13.08290 | 3.00000 | 1.61997 | 63.8 | −2.9E−06 |
| 9 | −7.64250 | 3.73540 | | | |
| 10 | −5.44730 | 0.70000 | 1.94595 | 18.0 | 3.4E−06 |
| 11 | −10.04700 | 2.90010 | | | |
| 12 | ∞ | 0.70000 | 1.51680 | 64.1 | 2.2E−06 |
| 13 | ∞ | 0.10000 | | | |
| Image Plane | ∞ | | | | |

TABLE 39

Aspherical Surface Data

Surface 1

K = 0.00000E+00, A4 = 3.94416E−03, A6 = −4.30110E−04,
A8 = 3.84448E−05 A10 = −2.45366E−06, A12 = 9.92399E−08,
A14 = −2.21634E−09, A16 = 2.03759E−11

Surface 2

K = −2.50448E−01, A4 = 5.81151E−03, A6 = −4.46997E−04,
A8 = 3.07892E−05 A10 = 4.87662E−06, A12 = −1.30472E−06,
A14 = 1.16539E−07, A16 = −3.69489E−09

Surface 4

K = 0.00000E+00, A4 = −3.77028E−03, A6 = 9.78600E−05,
A8 = −1.41468E−04 A10 = 3.24402E−05, A12 = −3.88823E−06,
A14 = 1.26596E−07, A16 = 3.12906E−09

Surface 5

K = −1.56954E+00, A4 = −1.75279E−03, A6 = −3.23482E−04,
A8 = 1.03796E−04 A10 = −2.25274E−05, A12 = 2.64435E−06,
A14 = −1.63109E−07, A16 = 4.04899E−09

TABLE 40

Various Data

| | |
|---|---|
| Focal length | 5.4620 |
| F number | 2.05620 |
| Half angle of view | 39.7951 |
| Image height | 3.9188 |
| Overall lens length | 23.8876 |
| Entrance pupil position | 4.2034 |
| Exit pupil position | −12.4183 |
| Front principal point position | 7.2606 |
| Rear principal point position | 18.4256 |

TABLE 41

Lens Element Data

| Lens | Front surface | Focal length |
|---|---|---|
| 1 | 1 | −8.7906 |
| 2 | 4 | 7.8639 |
| 3 | 6 | −16.5523 |
| 4 | 8 | 8.2379 |
| 5 | 10 | −13.5832 |

(Values Corresponding to Conditions)

The following table shows various values corresponding to the numerical examples.

TABLE 1

| | First Example | Second Example | Third Example | Fourth Example | Fifth Example | Sixth Example | Seventh Example | Eighth Example | Ninth Example | Tenth Example |
|---|---|---|---|---|---|---|---|---|---|---|
| $f$ | 3.39 | 3.39 | 3.38 | 3.39 | 3.39 | 3.38 | 3.38 | 3.39 | 0.98 | 5.46 |
| $dn/dt_{p1}$ | −5.7E−06 | −3.6E−06 | −5.7E−06 | −5.7E−06 | −5.7E−06 | −7.0E−07 | −5.7E−06 | −7.0E−07 | −4.0E−07 | −5.7E−06 |
| $dn/dt_{p2}$ | −5.7E−06 | −9.4E−06 | −5.7E−06 | −3.6E−06 | −7.0E−07 | −7.0E−07 | −5.7E−06 | −5.7E−06 | −2.9E−06 | −2.9E−06 |
| $dn/dt_{m1}$ | 9.0E−07 | 3.3E−06 | 2.6E−06 | 3.9E−06 | 2.4E−06 | 3.0E−06 | 3.7E−06 | 6.7E−06 | 3.9E−06 | 2.9E−06 |
| $dn/dt_{m2}$ | −2.0E−07 | −2.0E−07 | −2.0E−07 | −2.0E−07 | 3.0E−07 | 5.0E−07 | 3.4E−06 | 3.4E−06 | 6.3E−06 | 5.0E−07 |
| $dn/dt_{m3}$ | — | — | — | — | — | — | — | — | −2.0E−07 | 3.4E−06 |
| BF | 3.91 | 3.92 | 3.35 | 3.39 | 2.02 | 1.97 | 3.85 | 3.88 | 2.25 | 3.45 |
| dBF | 1.7E−04 | 1.8E−04 | 1.6E−04 | 1.4E−04 | 9.3E−05 | 2.3E−05 | 1.1E−04 | 9.1E−05 | 3.9E−05 | 2.2E−04 |
| dBF/BF | 4.4E−05 | 4.6E−05 | 4.7E−05 | 4.2E−05 | 4.6E−05 | 1.2E−05 | 2.7E−05 | 2.3E−05 | 1.8E−05 | 6.4E−05 |
| $f_2$ | 5.29 | 5.28 | 5.64 | 5.60 | 4.85 | 4.69 | 9.34 | 7.93 | 3.78 | 7.86 |
| $f/f_2$ | 0.64 | 0.64 | 0.60 | 0.61 | 0.70 | 0.72 | 0.36 | 0.43 | 0.26 | 0.69 |
| $f_{12}$ | 4.31 | 4.30 | 5.40 | 5.86 | 3.84 | 3.84 | −36.35 | −745.82 | 19.07 | 7.30 |
| $f/f_{12}$ | 0.79 | 0.79 | 0.62 | 0.58 | 0.88 | 0.88 | −0.09 | 0.00 | 0.05 | 0.75 |
| $f_3$ | 178.53 | 156.04 | 29.58 | 22.25 | −21.99 | −22.11 | 4.94 | 5.46 | 3.30 | 74.87 |
| $f/f_3$ | 0.02 | 0.02 | 0.11 | 0.15 | −0.15 | −0.15 | 0.68 | 0.62 | 0.30 | 0.07 |
| $V_{1m1}$ | 55.52 | 54.67 | 54.67 | 46.50 | 55.45 | 44.87 | 49.47 | 40.95 | 46.50 | 59.48 |

TABLE 1-continued

|  | First Example | Second Example | Third Example | Fourth Example | Fifth Example | Sixth Example | Seventh Example | Eighth Example | Ninth Example | Tenth Example |
|---|---|---|---|---|---|---|---|---|---|---|
| $v_{1m2}$ | — | — | — | — | — | — | — | — | 45.45 | — |
| $v_{3p1}$ | 71.68 | 71.34 | 68.62 | 63.33 | 67.00 | 67.00 | 71.68 | 81.56 | 63.86 | 63.88 |
| $v_{3m1}$ | 24.06 | 24.06 | 24.06 | 24.06 | 25.46 | 23.78 | 17.98 | 17.98 | 24.06 | 23.78 |
| $v_{3m2}$ | — | — | — | — | — | — | — | — | — | 17.98 |

In the above, the exemplary embodiments have been described as examples of the technique in the present disclosure. For this purpose, the accompanying drawings and the detailed description have been provided.

Therefore, the components described in the accompanying drawings and the detailed description can include not only the components necessary to solve the problem but also components unnecessary to solve the problem in order to illustrate the above technique. For this reason, it should not be immediately recognized that those unnecessary components are necessary just because those unnecessary components are described in the accompanying drawings and the detailed description.

In addition, because the above exemplary embodiments are for exemplifying the technique in the present disclosure, various modifications, replacements, additions, removals, or the like can be made without departing from the scope of the accompanying claims or the equivalent thereof.

INDUSTRIAL APPLICABILITY

The present disclosure can be applied to an on-vehicle camera, a surveillance camera, a web camera, and other devices. In particular, the present disclosure is beneficial for cameras such as on-vehicle cameras that are used in a wide temperature range.

REFERENCE MARKS IN THE DRAWINGS

L1 first lens element
L2 second lens element
L3 third lens element
L4 fourth lens element
G1 first lens group
G2 second lens group
G3 third lens group
CG parallel plate
A aperture diaphragm
S image plane
100 on-vehicle camera
201 imaging lens system
202 imaging device

The invention claimed is:

1. An imaging lens system comprising, in order from an object side to an image side:
   a first lens group consisting of at least one lens element having negative power;
   a second lens group having positive power and configured with a single lens element; and
   a third lens group having power,
   wherein a lens element closest to the object side in the first lens group is a negative meniscus lens having a convex surface on the object side,
   the third lens group includes a lens element having positive power and a lens element having negative power, and conditional expressions (1), (2), (4), and (7) shown below are simultaneously satisfied, $$-1.2\times10^{-5} < dn/dt_{pi} < 0, \text{ where } i \geq 1 \quad (1)$$

$$-1.0\times10^{-6} < dn/dt_{mi} < 1.5\times10^{-5}, \text{ where } i \geq 1 \quad (2)$$

$$0.58 \leq f/f_{12} < 1.5 \quad (4)$$

$$v_{3mi} < 35, \text{ where } i \geq 1 \quad (7)$$

where
$dn/dt_{pi}$ is a relative refractive index temperature coefficient of an i-th lens element having positive power included in an entire system for light in a wavelength range from 580 nm to 640 nm, inclusive, in air in a range from 0° C. to 20° C., inclusive,
$dn/dt_{mi}$ is a relative refractive index temperature coefficient of an i-th lens element having negative power included in the entire system for light in a wavelength range from 580 nm to 640 nm, inclusive, in air in a range from 0° C. to 20° C., inclusive,
f is a focal length of the entire system at a d-line,
$f_{12}$ is a composite focal length of the first lens group and the second lens group at the d-line, and
$v_{3mi}$ is the Abbe number at the d-line of an i-th lens element having negative power included in the third lens group.

2. The imaging lens system according to claim 1, wherein conditional expression (3) shown below is satisfied, $$0.1 < f/f_2 < 1.2 \quad (3)$$

where
f is a focal length of the entire system at a d-line, and
$f_2$ is a focal length of the second lens group at the d-line.

3. The imaging lens system according to claim 1, wherein conditional expression (5) shown below is satisfied, $$v_{1mi} > 35, \text{ where } i \geq 1 \quad (5)$$

where
$v_{1mi}$ is an Abbe number at a d-line of an i-th lens element having negative power included in the first lens group.

4. The imaging lens system according to claim 1, wherein conditional expression (6) shown below is satisfied, $$v_{3pi} > 50, \text{ where } i \geq 1 \quad (6)$$

where $v_{3pi}$ is an Abbe number at a d-line of an i-th lens element having positive power included in the third lens group.

5. The imaging lens system according to claim 1, wherein conditional expression (8) shown below is satisfied, $$-0.3 < f/f_3 < 1.0 \quad (8)$$

where
f is a focal length of the entire system at a d-line, and
$f_3$ is a focal length of the third lens group at the d-line.

6. The imaging lens system according to claim 1, wherein conditional expression (5b) shown below is satisfied, $$40.95 \leq v_{1mi} \leq 59.6, \text{ where } i \geq 1 \quad (5b)$$

where $\nu_{1mi}$ is the Abbe number at the d-line of an i-th lens element having negative power included in the first lens group.

7. A camera comprising:
an imaging lens system that forms an optical image of an object; and
an imaging device that converts the optical image formed by the imaging lens system into an electrical image signal,
wherein the imaging lens system includes, in order from an object side to an image side,
   a first lens group consisting of at least one lens element having negative power,
   a second lens group having positive power and configured with a single lens element, and
   a third lens group having power,
the third lens group includes a lens element having positive power and a lens element having negative power,
a lens element closest to the object side in the first lens group is a negative meniscus lens having a convex surface on the object side, and
conditional expressions (1), (2), (4), and (7) shown below are simultaneously satisfied, $$-1.2 \times 10^{-5} < dn/dt_{pi} < 0, \text{ where } i \geq 1 \quad (1)$$

$$-1.0 \times 10^{-6} < dn/dt_{mi} < 1.5 \times 10^{-5}, \text{ where } i \geq 1 \quad (2)$$

$$0.58 \leq f/f_{12} < 1.5 \quad (4)$$

$$\nu_{3mi} < 35, \text{ where } i \geq 1 \quad (7)$$

where
$dn/dt_{pi}$ is a relative refractive index temperature coefficient of an i-th lens element having positive power included in an entire system for light in a wavelength range from 580 nm to 640 nm, inclusive, in air in a range from 0° C. to 20° C., inclusive,
$dn/dt_{mi}$ is a relative refractive index temperature coefficient of an i-th lens element having negative power included in the entire system for light in a wavelength range from 580 nm to 640 nm, inclusive, in air in a range from 0° C. to 20° C., inclusive,
f is a focal length of the entire system at a d-line,
$f_{12}$ is a composite focal length of the first lens group and the second lens group at the d-line, and
$\nu_{3mi}$ is the Abbe number at the d-line of an i-th lens element having negative power included in the third lens group.

* * * * *